(12) United States Patent
Borracini et al.

(10) Patent No.: US 8,327,092 B2
(45) Date of Patent: Dec. 4, 2012

(54) MEMORY DEVICE CONFIGURABLE AS INTERLEAVED OR NON-INTERLEAVED MEMORY

(75) Inventors: Evandro José Pitaro Borracini, Campinas (BR); Marcelo Del Fiore de Araujo, Santo Antonio de Posse (BR); Jefferson Bastreghi, Hortolandia (BR); Ross Sinclair Scouller, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 548 days.

(21) Appl. No.: 12/563,259

(22) Filed: Sep. 21, 2009

(65) Prior Publication Data

US 2011/0072190 A1 Mar. 24, 2011

(51) Int. Cl.
*G06F 12/00* (2006.01)
*G06F 12/02* (2006.01)

(52) U.S. Cl. . 711/157; 711/103; 711/149; 711/E21.001; 711/E12.008

(58) Field of Classification Search .................. 711/103, 711/149, 157, E12.001, E12.008
See application file for complete search history.

(56) References Cited

U.S. PATENT DOCUMENTS

| | | | |
|---|---|---|---|
| 6,049,855 A * | 4/2000 | Jeddeloh ....................... 711/157 |
| 2001/0033524 A1 | 10/2001 | Tomaiuolo et al. |
| 2004/0156361 A1 | 8/2004 | Shimizu |
| 2007/0168625 A1 | 7/2007 | Cornwell et al. |
| 2007/0233939 A1 | 10/2007 | Kim |

FOREIGN PATENT DOCUMENTS

EP 1191445 A2 3/2002

OTHER PUBLICATIONS

PCT Application No. PCT/US2010/045573; Search Report and Written Opinion dated Apr. 25, 2011.
Freescale Semiconductor, Inc., "Chapter 6: Flash Memory (FM)," 56F8300 Peripheral User Manual: 16-bit Hybrid Controllers, MC56F8300UM, Rev. 10, Oct. 2007, pp. 6.1-6.8.

* cited by examiner

*Primary Examiner* — Jasmine Song

(57) ABSTRACT

A device is disclosed having a memory module that comprises a first memory block, a second memory block, a programmable storage location, and a memory controller. The first memory block of non-volatile memory comprises a plurality of word locations and an address decoder coupled to a first access port of the memory controller. The address decoder to select one of the plurality of word locations for access in response to receiving address information via the first access port. The second memory block comprising a plurality of word locations and an address decoder coupled to a second access port of the memory controller. The address decoder to select one of the plurality of word locations for access in response to receiving address information via the second access port. The memory controller comprising an input coupled to the programmable storage location, and to access, in response to the programmable configuration information having a first value, a first portion of the first memory block and a first portion of the second memory block as interleaved memory, a second portion of the first memory block as non-interleaved memory, and a second portion of the second memory block as non-interleaved memory.

20 Claims, 14 Drawing Sheets

US 8,327,092 B2

MEMORY DEVICE CONFIGURABLE AS INTERLEAVED OR NON-INTERLEAVED MEMORY

FIELD OF THE DISCLOSURE

The present disclosure generally relates to electronic devices and methods of accessing memory.

BACKGROUND

Various data processing devices, such as integrated circuits that include instruction based processing devices, access interleaved memory arrays that accommodate access rates that are higher than that available with non-interleaved memories. However, memory arrays organized as interleaved memory are not read-while-write accessible because of the pipelined nature in which they are accessed to increase access speed. To provide read-while-write memory capability additional memory arrays have been provided separate from the interleaved memory that is read-while-write accessible.

DETAILED DESCRIPTION OF THE DRAWINGS

A device having a memory module is disclosed that is configurable to support interleaved and non-interleaved partitions of varying sizes based upon a configuration indicator. Specific embodiments will be better understood with reference to FIGS. 1-16.

Figure 1:
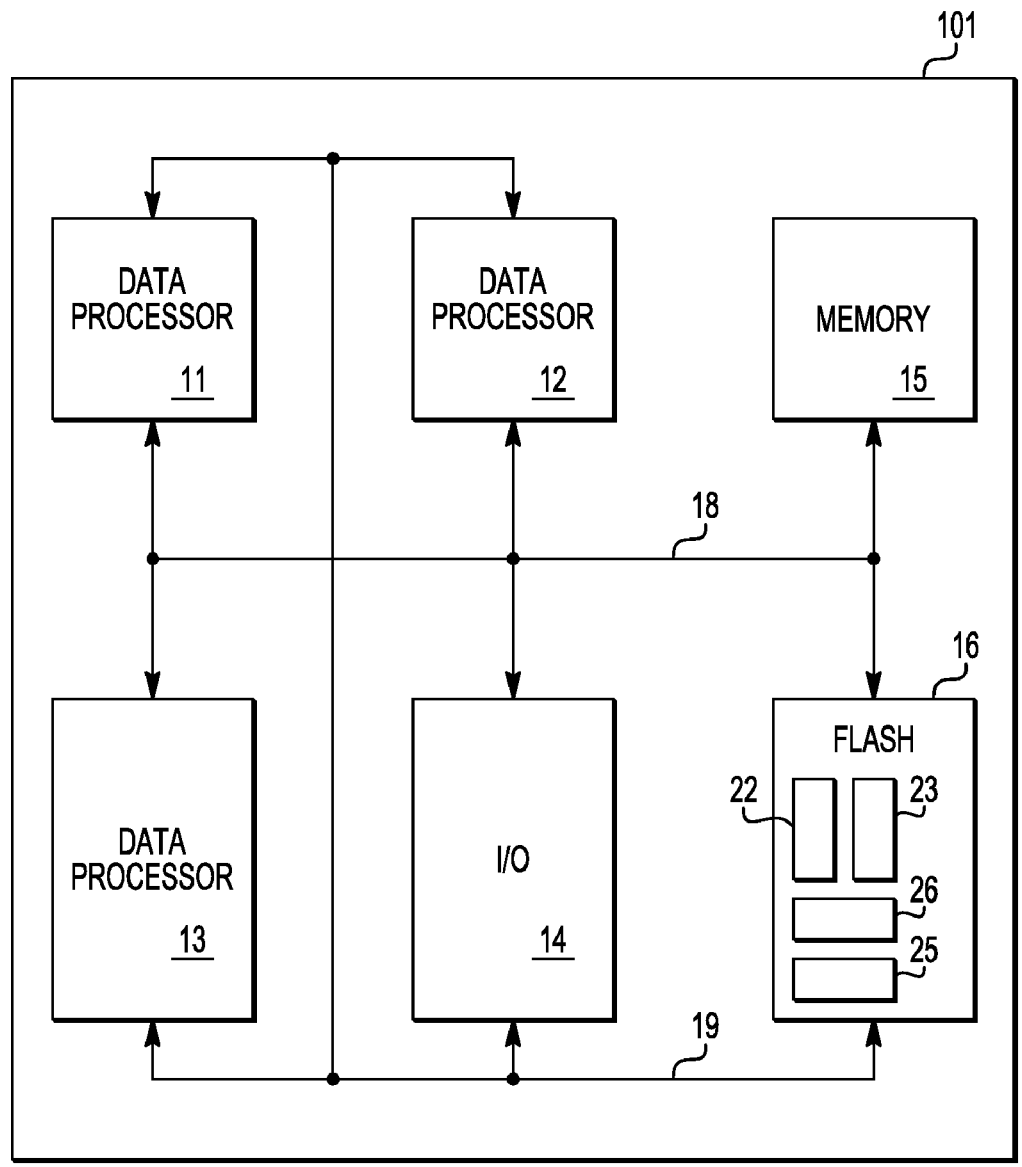
FIG. 1 illustrates a block diagram of a device in accordance with a specific embodiment.

FIG. 1 illustrates a device 10 that includes an integrated circuit device 101. In accordance with a specific embodiment, integrated circuit device 101 includes one or more functional modules including data processor 11, data processor 12, data processor 13, Input/Output (I/O) module 14, a memory module 15, a memory module 16, a bus 18, and a bus 19 that can be integrated at a common die. During operation, the bus 18 communicates information between each of the modules 11-16. The bus 19 is separate from the bus 18, and communicates information between modules 11-14 and 16. For ease of reference, integrated circuit device 101 is referred to herein as a system-on-a-chip (SOC).

Device 10 is an application specific device, such as a portable or non-portable computing device designed to implement a specific or general purpose application. For example, device 10 can include a handheld communication device, a data networking device, a desktop computing device, a handheld computing device, the like, and combinations thereof. Data processors 11-13 can be instruction-based data processors that receive and execute instructions, such as user-provided application program instructions from memory to implement a specific application. For example, the instructions can be received from memory integrated at the SOC, e.g., memories 15 and 16, and from memories external to the SOC (not shown) that can be access via I/O module 14. Memory modules 15 and 16 can be volatile or non-volatile memories. In the specific embodiment described herein, memory module 15 is considered to be a volatile memory that is read and write accessible via bus 18, while memory module 16 is considered to be a non-volatile Flash memory that is read accessible via bus 18 and write accessible via bus 19.

Memory module 16 includes a memory block 22, a memory block 23 (memory blocks 22 and 23), a memory controller 26, and a programmable storage location 25. Each of memory blocks 22 and 23 include a memory array having memory that is configurable by the memory controller 26 as non-interleaved memory, interleaved memory, or a combination of interleaved and non-interleaved memory based upon a configuration indicator stored at the programmable storage location 25.

Figure 2:
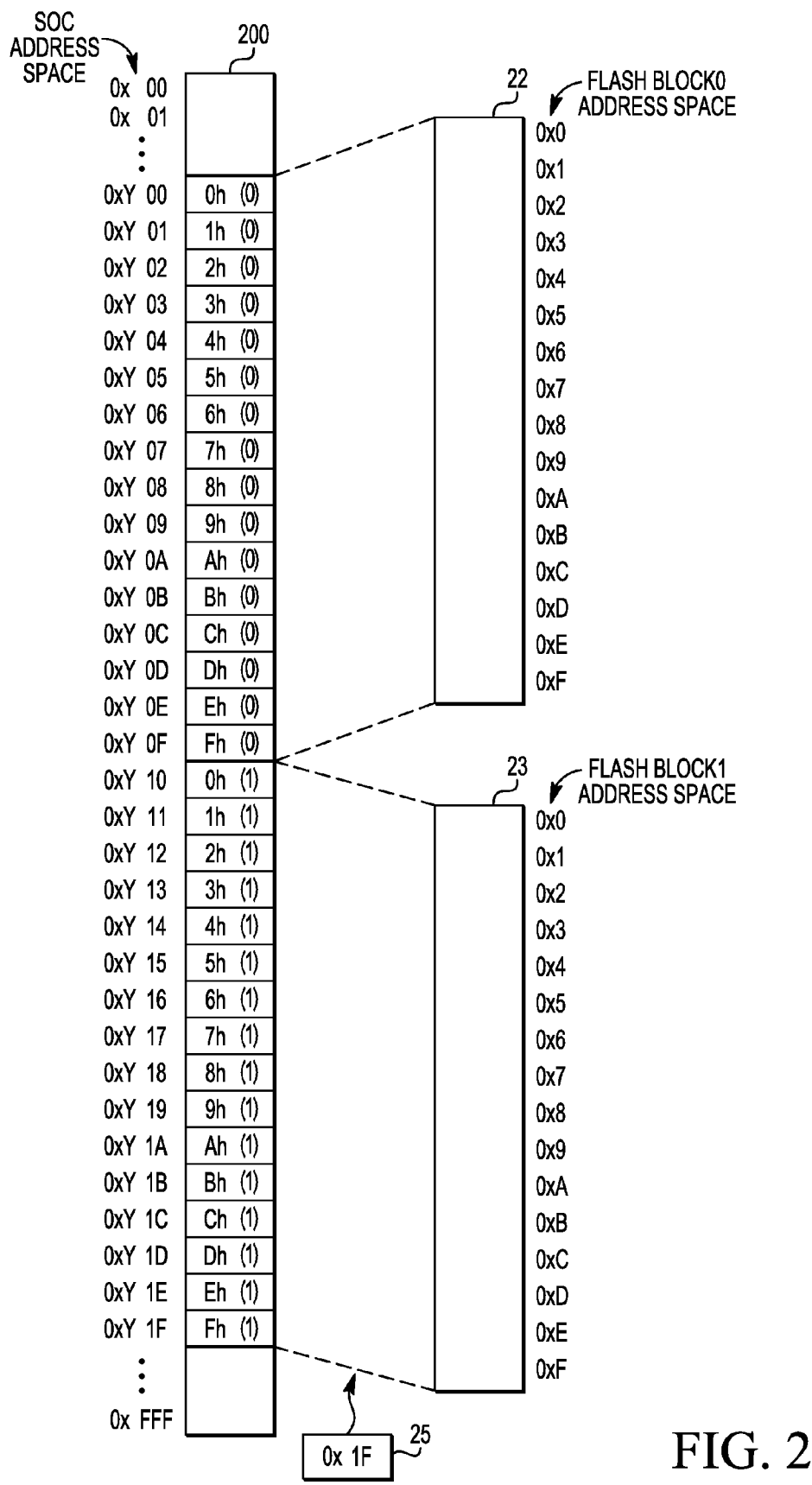
FIGS. 2 and 3 illustrate particular partitionings of a memory module of FIG. 1 based upon configuration indicators in accordance with specific embodiments.

FIG. 2 illustrates a specific embodiment of the partitioning of physical address space of the SOC 101, referred to as SOC address space 200, which includes addresses in the range of 0x0-0xFFFF. The physical address space of the memory module 16 with the SOC address space 200, referred to as the memory module 16 address space and is illustrated to include, addresses 0x00-0x1F, is mapped to the SOC address space 200 in the range of 0xY00-0xY1F, where Y is referred to as a "base address" that represents the upper-most bits associated with each address of the memory module 16 within the SOC address map. The base address Y can be a fixed or programmable value. For ease of illustration, the memory module 16 illustrated at FIG. 2 has been chosen to have a five-bit address that can access 32 word locations of memory module 16, though it will be understood that memory module 16 will typically include a larger address space capable of accessing more than 32 locations associated with data units, such as bits, bytes, words, double-words, and the like.

During operation, the 32 addresses of memory module 16, addresses 0x00-0x1f, are themselves mapped to specific memory locations at memory blocks 22 and 23 based upon a configuration indicator at programmable storage location 25, and therefore are considered physical addresses of memory module 16. Therefore, in accordance with the specific embodiment illustrated at FIG. 2, the programmable storage location 25 stores a configuration indicator that results in the memory controller 26 of memory module 16 translating, e.g., mapping, the 32 addresses of the memory module 16 address space to 32 respective word locations of memory blocks 22 and 23 to implement two non-interleaved memory partitions. Specifically, the sixteen memory locations accessed at physical addresses 0x00-0x0F of memory module 16 are mapped to the sixteen word locations memory block 22 in the address range of 0x0-0xF to implement a non-interleaved partition of memory module 16, and the sixteen memory locations accessed at physical addresses 0x10-0x1F of memory module 16 are mapped to the sixteen word locations of memory block 23 in the address range of 0x0-0xF to implement another non-interleaved partition of memory module 16.

Therefore, SOC address 0×Y00 is mapped to the memory module 16 address 0×00, which is mapped to the address 0×0 of memory block 22, as indicated at FIG. 2 by the designator 0h (0) shown at the location of address space 200 that is associated with address 0×Y00, where (0) indicates that a memory location of memory block 22 is mapped to SOC address, 0×Y00 and 0h of the designator indicates the hexadecimal address of the specific memory location of memory block 22 mapped to this location. Similarly, SOC address location 0×Y10 is mapped to the address 0×0 of memory block 23 as indicated by the designator 0h (1) at address 0×Y10 of SOC address space 200, where (1) indicates that a memory location of memory block 23 is mapped to this SOC address, and 0h indicates the hexadecimal address of the specific memory location of memory block 23 mapped to this location.

Figure 3:
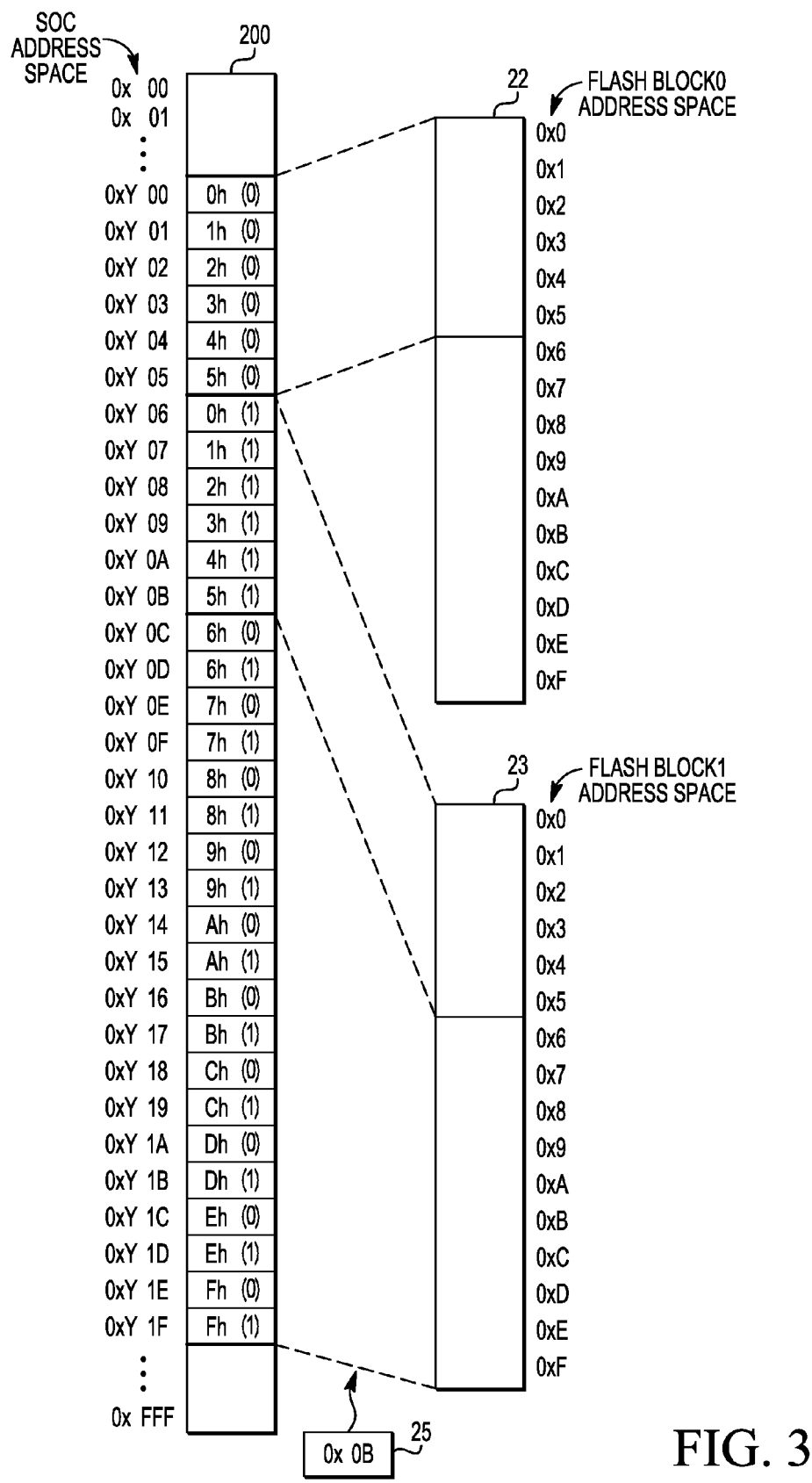

FIG. 3 illustrates the SOC address space 200 mapping to memory blocks 22 and 23 based upon a different configuration indicator at programmable storage location 25. In accordance with the specific embodiment illustrated at FIG. 3, the programmable storage location 25 stores a configuration indicator that results in the memory controller 26 of memory module 16 mapping the memory locations of memory module 16 as follows: a first portion of the 16 memory locations, e.g., the first six locations, of memory block 22 are mapped as a non-interleaved partition at the memory module 16 address range of 0×0-0×5; a first portion of the 16 memory locations, e.g., the first six locations, of memory block 23 are mapped as a non-interleaved partition at the memory module 16 address range of 0×6-0×B, and is contiguous to the memory module 16 address range of the non-interleaved memory block associated with memory block 22; a second portion of the 16 memory locations of memory block 22 and a second portion of the 16 memory locations of memory block 23, e.g., the remaining ten locations of each block, are mapped as an interleaved partition at the memory module 16 address range of 0×0C-0×1F. Therefore, SOC address location 0×Y00 is mapped to the physical address 0×0 of memory block 22 (as indicated by designator 0h (0)), SOC address location 0×Y06 is mapped to the physical address 0×0 of memory block 23 (see designator 0h (1)), SOC address location 0×Y0C is mapped to the physical address 0×6 of memory block 22 (see designator 6h (0)), and SOC address location 0×Y0D is mapped to the physical address 0×6 of memory block 23 (see designator 6h (0)).

Figure 4:
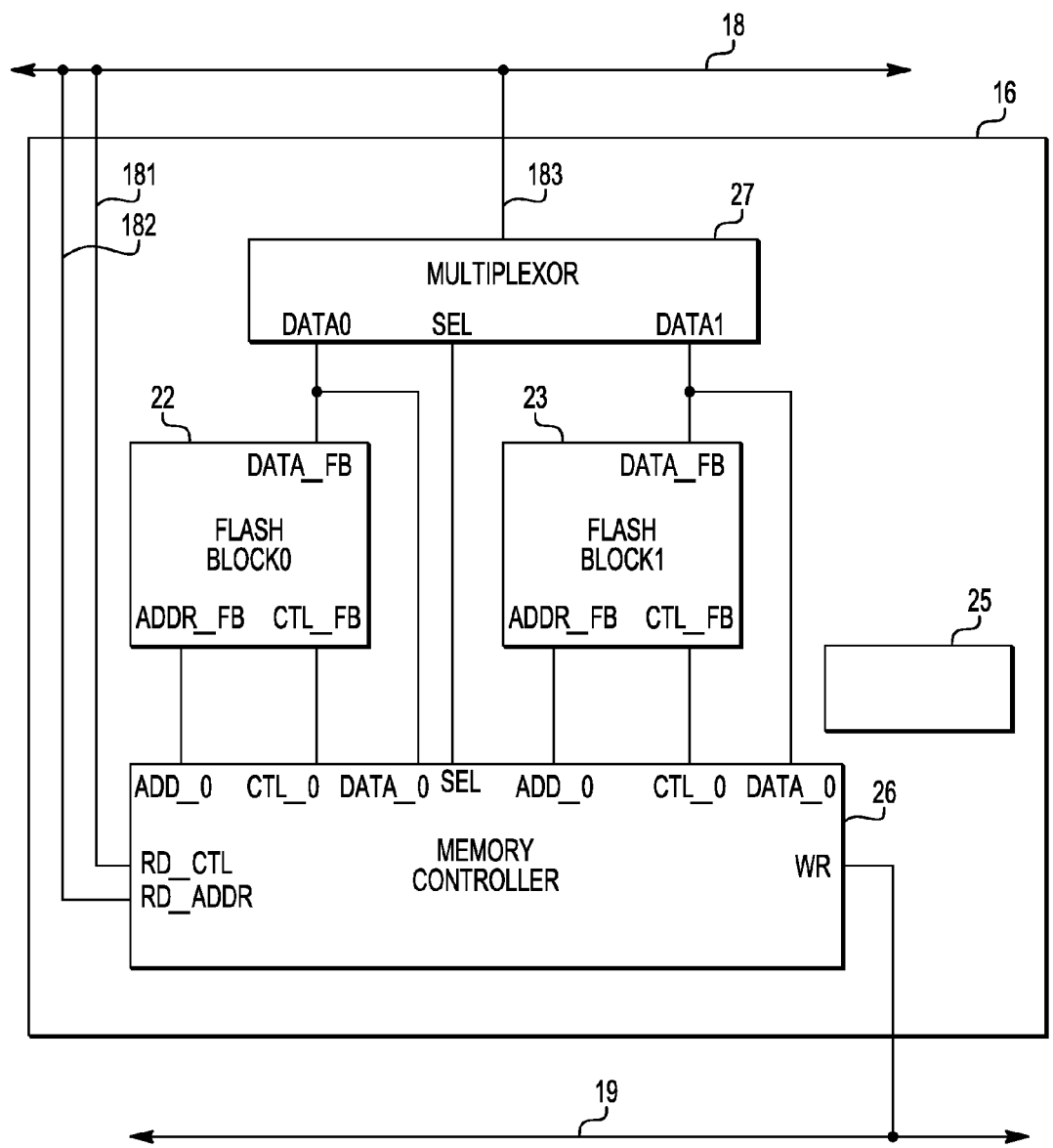
FIG. 4 illustrates a block diagram of a memory module of FIG. 1 in accordance with a specific embodiment.

FIG. 4 illustrates a specific embodiment of memory module 16 including memory block 22 referred to as a flash block and labeled FLASH BLOCK0, memory block 23 referred to as a flash block, and labeled FLASH BLOCK1, memory controller 26, programmable storage location 25, and a multiplexor 27. Bus 18 is connected to a read port of memory module 16 that includes interconnects 181, 182 and 183. Bus 19 is connected to a write port, WR, of memory module 16.

Memory controller 26 includes: a read port to receive read requests, and includes a control portion, labeled RD_CTL, that is connected to interconnect 181, and an address portion, labeled RD_ADDR, that is connected to interconnect 182; a write port, labeled WR, to receive write requests including control information, address information, and data information to be stored; a first memory block access port that includes a first portion, labeled ADD_0, a second portion, labeled CTL_0, and a third portion, labeled DATA_0; a second memory block access port that includes a first portion, labeled ADD_1, a second portion, labeled CTL_1, and a third portion, labeled DATA_1; and a select output.

FLASH BLOCK0 includes an access port to receive read and write requests, and includes a first portion, labeled ADDR_FB, connected to ADD_0 of memory controller 26, a second portion, labeled CTL_FB, connected to CTL_0, and a third portion connected to DATA_0.

FLASH BLOCK1 includes an access port to receive read and write requests, and includes a first portion labeled ADDR_FB connected ADD_1 of memory controller 26, a second portion labeled CTL_FB connected to CTL_1, and a third portion connected to DATA_1. FLASH BLOCK 0 and FLASH BLOCK1 can be identical instantiations of each other.

Multiplexor 27 includes a data port labeled DATA_0 connected to DATA_FB of FLASH BLOCK0, a data port labeled DATA_1 connected to DATA_FB of FLASH BLOCK1, a select input connected to the select output of the memory controller 26, and a data port labeled DATA_OUT connected to interconnect 187 to provide information received at one of DATA_0 and DATA_1.

The programmable storage location 25 can be a register associated with the programming model of SOC 101, a storage location mapped to the address space of memory module 16, as described in greater detail later, or other type storage location that is accessible by the memory controller 26.

Figure 5:
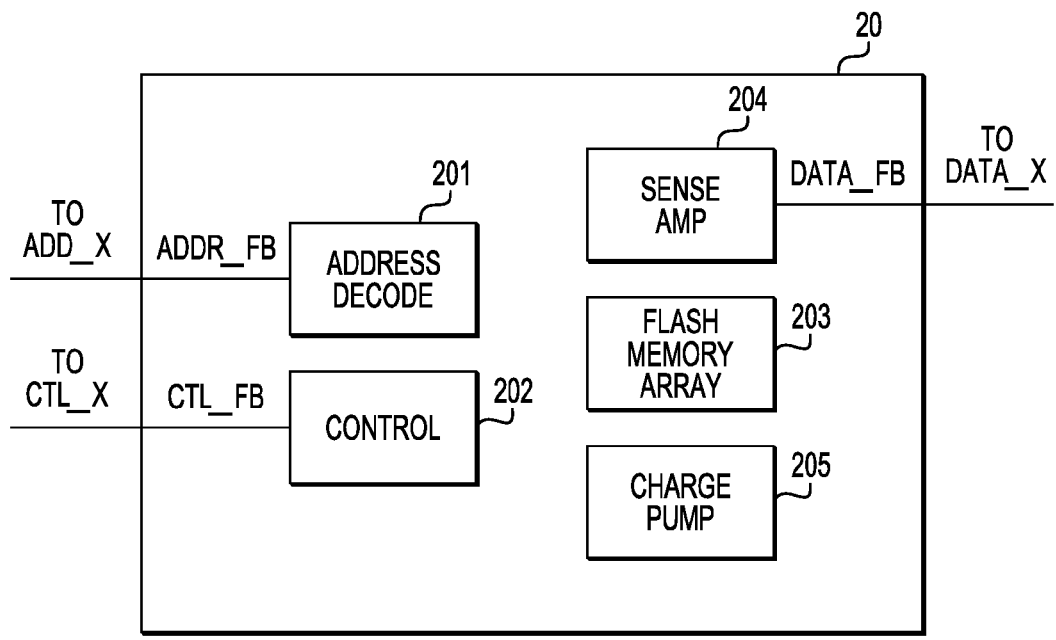
FIG. 5 illustrates a block diagram of a flash block of FIG. 4 in accordance with a specific embodiment.

FIG. 5 illustrates an instantiation of a flash block 20 that can represent FLASH BLOCK0 and FLASH BLOCK1. Flash block 20 includes: an address port ADDR_FB that is connected to ADD_x, which represents either ADD_0 or ADD_1 of an access port of memory controller 26 of FIG. 4; a control port CTL_FB connected to CTL_x, which represents either ADD_0 or ADD_1 of an access port of the memory controller 26; a data port DATA_FB connected to DATA_x, which represents either data port DATA_0 or DATA_1 of multiplexer 27; an address decode module 201 is connected to ADDR_FB; a control module 202 connected to CTL_FB; a sense amplifier 204; a flash array 203 connected to DATA_FB; and a charge pump 205.

Figure 6:
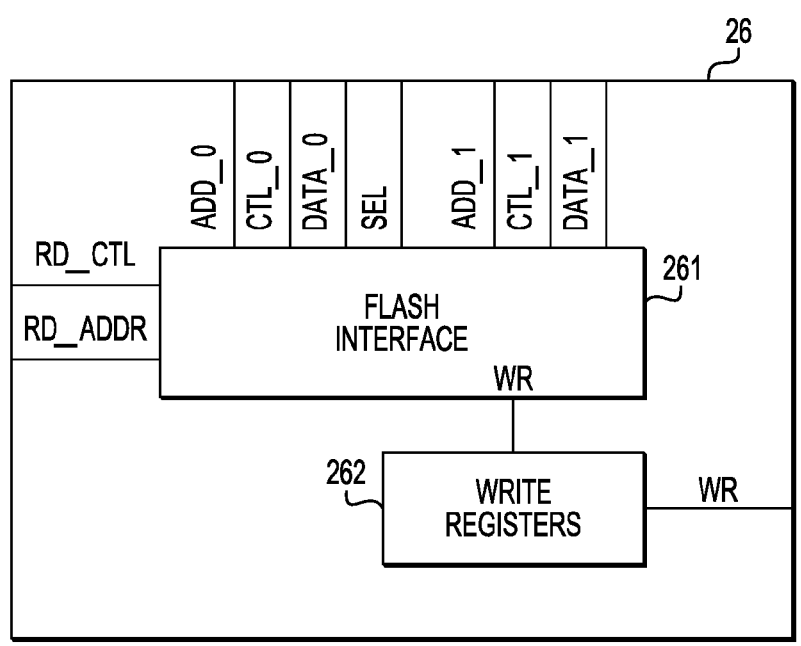
FIG. 6 illustrates a block diagram of a memory controller of FIG. 5 in accordance with a specific embodiment.

FIG. 6 illustrates a specific embodiment of the memory controller 26 including a flash interface module 261, and write registers 262. Write registers 262 includes registers that are written to via bus 19 to initiate write requests, e.g., program and erase operations, at memory module 16. The flash interface module 261 includes the read port of the memory controller 26 that receives read requests from bus 18, a write port, labeled WR, that receives write requests from the write registers 262, the first memory block access port that is connected to FLASH BLOCK0, and the second memory block access port that is connected to FLASH BLOCK1.

In accordance with a specific embodiment, during operation the flash interface module 261 has the following features: orthogonal read and write requests are supported to partitions of non-interleaved memory at different memory blocks; orthogonal reads and writes are not supported to an interleaved memory partition, e.g., a partition that includes memory locations of both FLASH BLOCK0 and FLASH BLOCK1, or to a non-interleaved memory partition since read requests are received one at a time via bus 18 and because FLASH BLOCK0 and FLASH BLOCK1 are multiplexed by multiplexer 27 (FIG. 4) to share a common data portion of the read port connected to bus 18; contiguous reads via bus 18 to memory locations within the same flash block, result in a hold-off period in the read cycle of a read request, e.g., the second read request, this hold-off period is not present in the read cycle of the second read request, e.g., the first read request, when contiguous reads are made to memory locations in different flash blocks of the memory module 16.

As used herein, the term "orthogonal" as used with respect to supporting multiple access requests to a memory module is intended to mean that there are no inter-related timing considerations between the access requests that affect when either access request can be provided to the memory module nor is there any variation as to how long it takes the memory module to complete an access request based upon when the other access request was received. For example, a read request to memory module 16 that reads information from memory block 22 is orthogonal to a write request to memory module 16 that writes information to memory block 23. Therefore, in this situation, the time at which a result from the read request is returned to a requesting device is not affected by the write request, regardless as to when the write request is received. Therefore, since flash interface module 261 can process a read to FLASH BLOCK0 and a write to FLASH BLOCK1 simultaneously, read and write requests to different flash blocks of memory module 16 are orthogonal.

Figure 7:
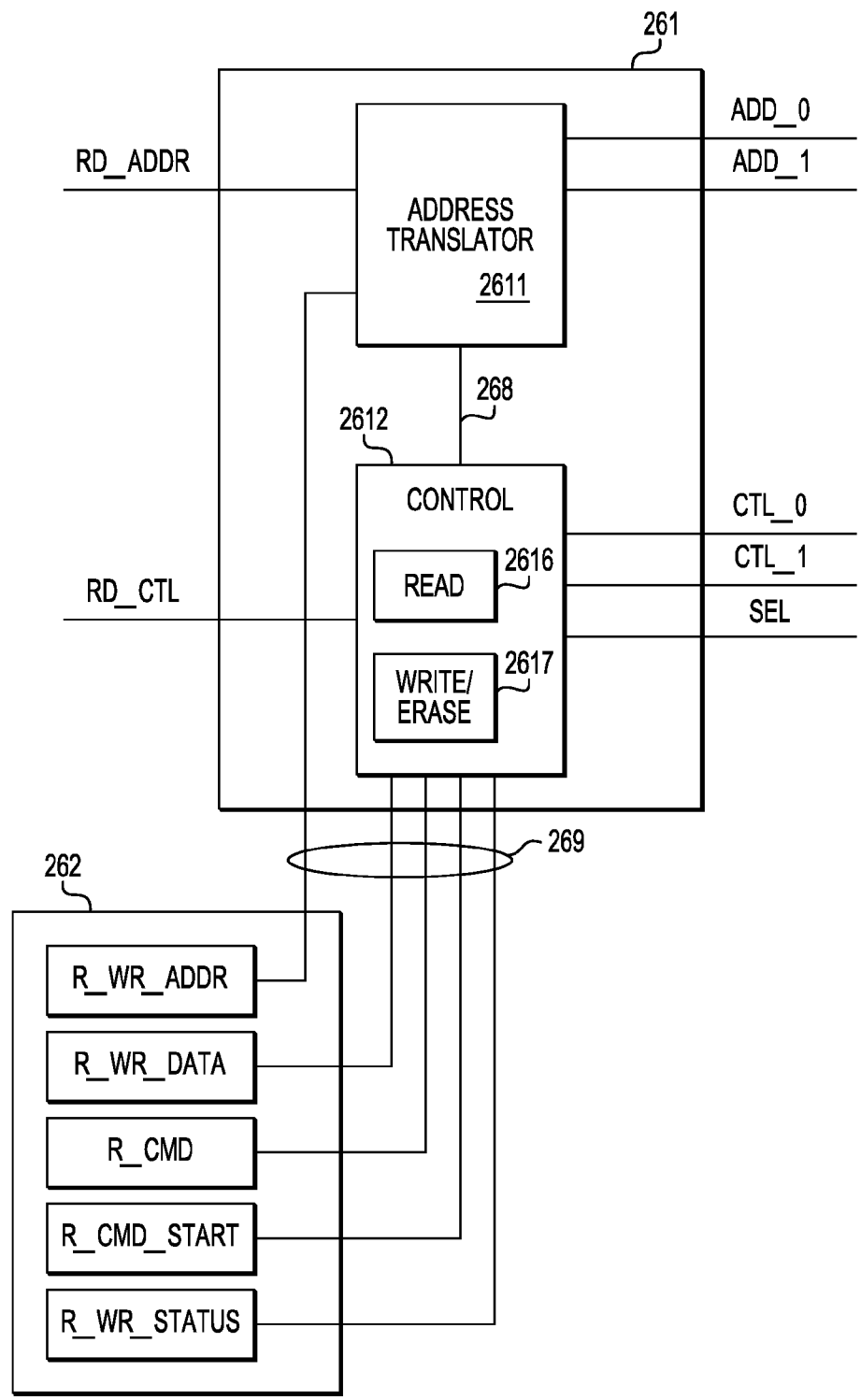
FIG. 7 illustrates a block diagram of a flash interface module of FIG. 6 in accordance with a specific embodiment.

FIG. 7 illustrates a specific embodiment of the Flash interface module 261 and the write registers 262. The write registers 262 include registers labeled R_WR_ADDR, R_WR_DATA, R_CMD, R_CMD_START, and R_STATUS. The write registers 262 are connected to a write port, WR, of flash interface module 261 via interconnects 269. The flash interface module 261 includes an address translator 2611 and a control module 2612. Control module 2612 includes a read control module to control read requests, and a write control module to control write requests.

Address translator 2611 is connected to receive information from ports including RD_ADDR, register R_WR_ADDR, control module 2612, and is connected to provide information to ADD_0, ADD_1, and to control module 2612. The control module 2612 is connected to receive information from ports including RD_CTL, RD_DATA, register R_WR_DATA, register R_CMD, register R_CMD_START, and register R_STATUS to provide information to CTL_0, CTL_1, SEL, DATA_0, $DATA_{13}$ 1, and address translator 2611.

During operation, control module 2612 will monitor information from bus 18 at RD_CTL, and information at register R_STATUS, to determine when an access request is received, e.g., a read request at RD_CTL or a write request at registers 262. In response to a read or write request being received, control module 2612 will communicate with address translator 2611 to provide an access request to FLASH BLOCK0, via ADD_0, CTL_0, and SEL, or to FLASH BLOCK1, via ADD_1, CTL_1, and SEL. Examples of access requests that can be received at control module 2612 from registers 262 include: a program request to store a word at memory module 16; an erase sector request to erase a specific sector of memory module 16; an erase multiple sectors request to erase a range of sectors of memory module 16; and an erase all request to erase all sectors of memory module 16. The control module 2612 will determine the current partitioning of the memory blocks of memory module 16 and provide one or more access requests to FLASH BLOCK0 and FLASH BLOCK1 based upon the received access request. For example: a write request received at memory module 16 can be translated by control module 2612 to a single write request to one of FLASH BLOCK0 and FLASH BLOCK1; an erase sector access request at memory module 16 can be translated to a single erase sector access request being provided to one of FLASH BLOCK0 and FLASH BLOCK1 when the sector being erased is configured as non-interleaved memory alternatively, the erase sector request can be translated into two erase sector access requests, one to each of FLASH BLOCK0 and FLASH BLOCK1, when the sector being erased is configured as interleaved memory; an access request to erase a range of sectors, or to erase all sectors, can translate to a multiple erase sector access requests being provided by the control module 2612 to each of FLASH BLOCK0 and FLASH BLOCK1.

During a read operation, the control module 2612 will enable the address translator 2611 to determine whether the SOC address received via bus 18, at RD_ADDR, is currently mapped to the memory module 16, and if so, the address translator 2611 will identify, based upon a configuration indicator stored at programmable storage location 25, whether the memory module 16 address portion of the SOC address is mapped to a memory location at FLASH BLOCK0 or at FLASH BLOCK1. In addition, the address translator 2611 will translate the memory module 16 address to the physical address of the currently selected flash block. It will be appreciated that the base address portion of the SOC address is used to determine if memory module 16 contains the memory location being accessed, and that once it is determined that the memory module 16 includes the memory location being accessed, that the base address portion of the SOC address is ignored allowing just that portion of the SOC address that corresponds to the memory module 16 address to be used by the address translator 2611 for further translation.

The address translator module 2611 provides to control module 2612 an indicator via interconnect 269 that identifies which of FLASH BLOCK0 and FLASH BLOCK1 of memory module 16 is mapped to the memory module 16 address. If the control module 2612 determines that the indicated flash block is available for a read operation, e.g., it is not being simultaneously accessed, nor is the other flash block being simultaneously read, the control module 2612 will provide appropriate read control signals to the selected memory block, via CTL_0 or CTL_1, and an indicator to address translator 2611 to provide the translated physical address to the selected memory block via ADD_0 or ADD_1. Therefore, the translated physical flash block address will be provided to ADD_0 and read control signals will be provided to CTL_0 when the read request is to FLASH BLOCK0, and the translated physical flash block address will be provided to ADD_1 and read control signals will be provided to CTL_1 when the read request is to FLASH BLOCK1.

A write operation is performed by storing write request information to write registers 262 via bus 19. For example, the memory module 16 address associated with the write request is stored at the register labeled R_WR_ADDR, the data to be programmed during a program write request is stored at the register labeled R_WR_DATA, information used to control the write request, such as information identifying the write request type, e.g., a program or erase write request, is stored at the registers labeled R_CMD, the actual write request is initiated at memory module 16 in response to storing a write start indicator a the register labeled R_CMD_START, and the status of a pending write request is stored at register R_STATUS.

In response to a write start indicator being asserted at R_CMD_START the control module 2612 will enable the address translator 2611 to determine whether the SOC address received via bus 19, at register R_WR_ADDR is currently mapped to the memory module 16, and if so, the address translator will identify, based upon the configuration indicator stored at programmable storage location 25, whether the memory module 16 address portion of the SOC address is mapped to a memory location at FLASH BLOCK0 or at FLASH BLOCK1. In addition, the address translator 2611 will translate the memory module 16 address to the physical address of the currently selected flash block. The address translator module 2611 provides an indicator to control module 2612 via interconnect 269 that identifies which of FLASH BLOCK0 and FLASH BLOCK1 of memory module 16 is mapped to the memory module 16 address. If the control module 2612 determines that the indicated flash block being written is available for access, e.g., it is not being simultaneously accessed, the control module 2612 will provide appropriate write control signals to the selected memory block, via CTL_0 or CTL_1, an indicator to address translator 2611 to provide the translated physical address to the selected memory block via ADD_0 or ADD_1, and the information stored at register R_WR_DATA to the selected memory block via DATA_0 or DATA_1 when the write request is a program write request.

Figure 8:
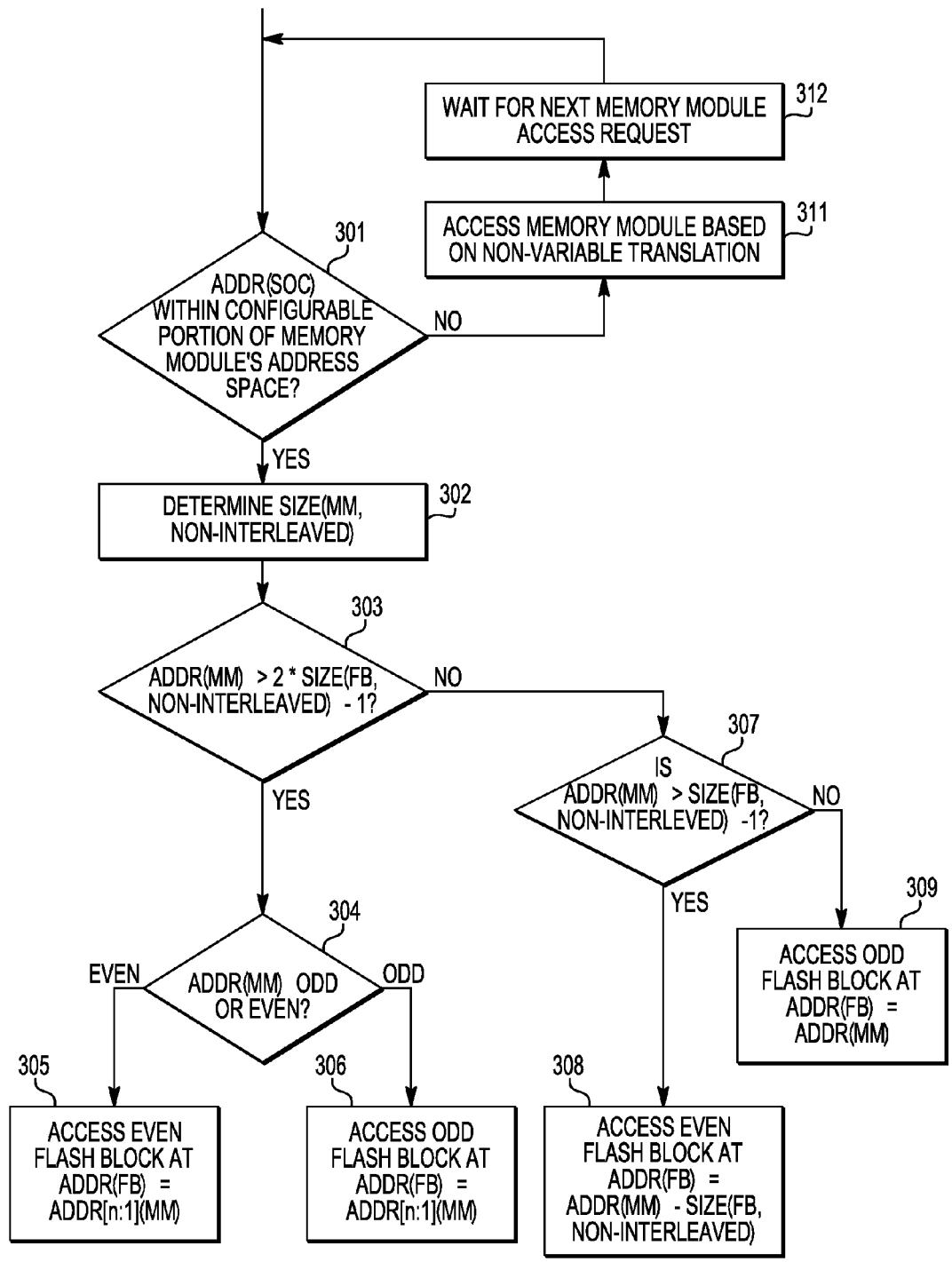
FIG. 8 illustrates a flow diagram of a method in accordance with a specific embodiment.
Figure 9:
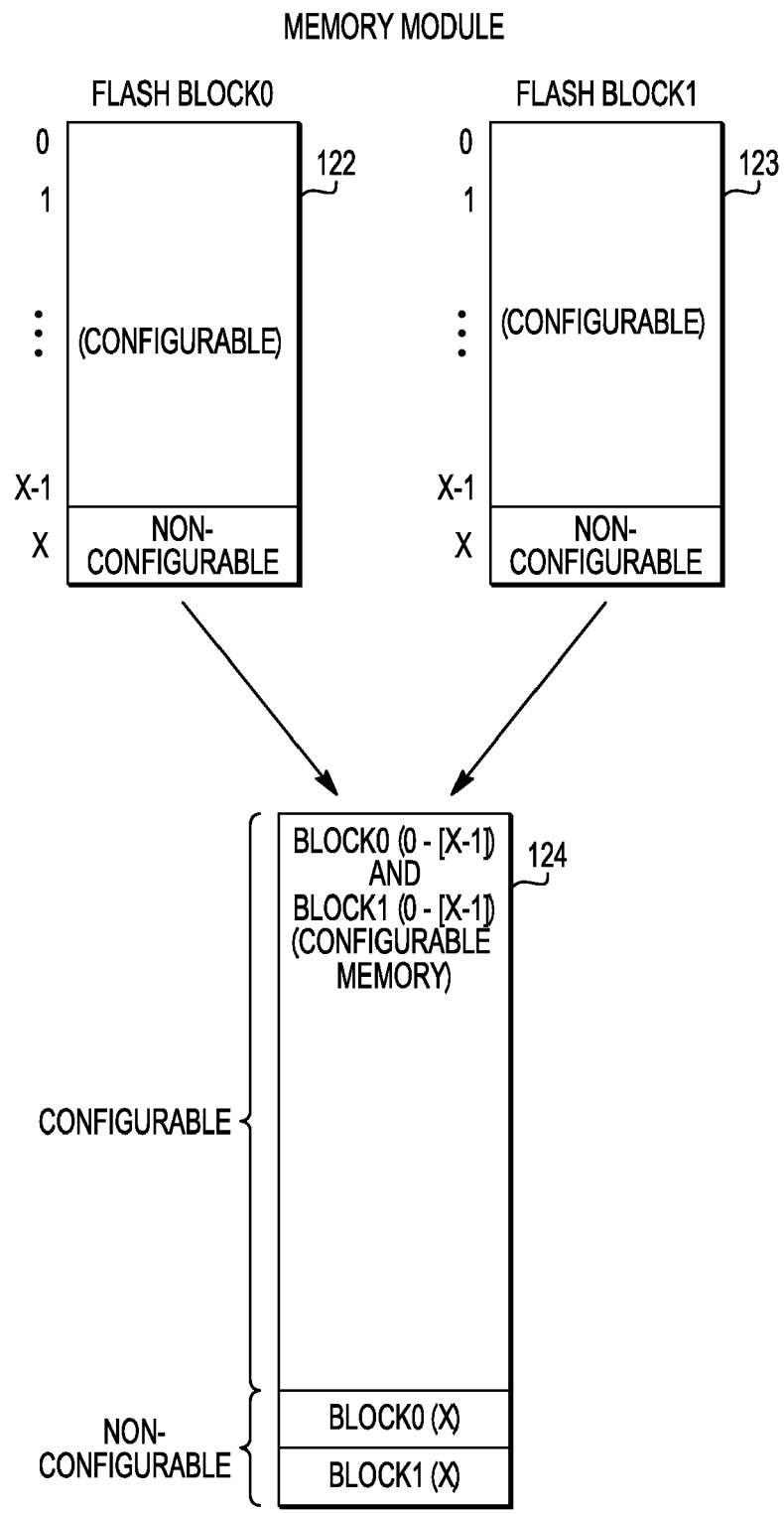
FIG. 9 illustrates a particular partitioning of a memory module in accordance with a specific embodiment.

Operation of address translator 2611 in accordance with a specific embodiment will be better understood with reference to the flow diagram of FIG. 8. The flow diagram of FIG. 8 presumes that the flash memory locations of memory module 16 are configured as illustrated as indicated at FIG. 9, where flash block 122 is a specific embodiment of memory block 22 (FLASH BLOCK0) and flash block 123 is a specific embodiment of memory block 23 (FLASH BLOCK1). As illustrated, an upper most portion of each of flash block 122 and of flash block 123 are configurable as either non-interleaved or interleaved memory, and a lower most portion each of flash block is non-configurable and presumed to be non-interleaved memory for purposes of discussion. For example, FLASH BLOCK0 includes X+1 sectors that are referenced herein as sectors BLOCK0(0)-BLOCK0(X), and FLASH BLOCK1 includes X+1 sectors referenced herein as sectors BLOCK1(0)-BLOCK1(X), where the number of word locations in a sector of a Flash block is the minimum number of word locations that can be erased at a Flash block by a single erase request. As illustrated, the sectors BLOCK0(0)-BLOCK0(X—1) and BLOCK1(0)-BLOCK1(X-1) are configurable memory locations and BLOCK0(X) and BLOCK1(X) are non-configurable memory locations. Flash block 122 and 123 are combined at flash module 16 to form address space 124. The configurable portion of address space 124 maps to configurable memory locations of BLOCK0 and BLOCK 1 differently based upon a configuration indicator, while the non-configurable portion of memory module 16 address space 124 maps to memory locations of non-configurable portions of BLOCK0 and BLOCK 1 the same independent of the configuration indicator.

At block 301 of FIG. 8, an SOC access request that maps to memory module 16 address space has been received at bus 18. A portion of the address associated with the SOC access request that is used by the memory module 16, referent to as the memory module 16 address, can be determined from the SOC address, e.g., (ADDR(SOC)), by the equation ADDR(MM)=ADDR[N:0](SOC), where N+1 is the number of bits associated with the address space of memory module 16. For example, N is equal to four (4) with respect to FIG. 2 and FIG. 3. It is determined at block 301 whether the memory module 16 address maps to a configurable portion of memory module 16's address space, and flow proceeds to block 311 if the memory module 16 address is not associated with a configurable memory location of memory module 16, otherwise flow proceeds to block 302 if the memory module 16 address is associated with a configurable address. For example, if the memory module 16 location being accessed is at one of sectors BLOCK0(0)-BLOCK0(X-1) or BLOCK1(0)-BLOCK1(X-1) of FIG. 9 it would be determined at block 301 that the memory module 16 address maps to a configurable portion of memory module 16.

At block 302, the size of the non-interleaved partition of a flash block (SIZE(FB, NON-INTERLEAVED)) of memory module 16 is determined based upon the configuration indicator. For example, a configuration indicator having a specific attribute, such as a value of zero (0) or a specific bit asserted, can indicate that zero sectors of each of the configurable portions of FLASH BLOCK0 and FLASH BLOCK1 are mapped as non-interleaved memory, whereby the configuration of memory module 16 can be referred to as an interleaved memory configuration, or as being in an interleaved mode of operation. A configuration indicator having a different attribute, such as a value of one (1), can indicate that one sector of each of the configurable portions of FLASH BLOCK0 and FLASH BLOCK1 are mapped as non-interleaved memory, and by implication that the remaining [X−2] sectors of the configurable portions of FLASH BLOCK0 and FLASH BLOCK1 are mapped as interleaved memory, whereby the configuration of memory module 16 can be referred to as mixed non-interleaved and interleaved memory configuration or as being in a mixed mode of operation. A configuration indicator of X−1 can indicate that X−1 sectors, e.g., all of the configurable sectors, of each of the configurable portions of FLASH BLOCK0 and FLASH BLOCK1 are mapped as non-interleaved memory, whereby no sectors of the configurable portions of FLASH BLOCK0 and FLASH BLOCK1 are mapped as interleaved memory, whereby the configuration of memory module 16 can be referred to as a non-interleaved memory configuration or as being in a non-interleaved mode of operation. In another embodiment, a configuration indicator can include information other than the number of sectors to be non-interleaved. It will be appreciated that, the configuration information can include information relating to the interleaved memory size, the address range of non-interleaved or interleaved memory, and the like. For example, the configuration indicator can include information to identify a starting address of the interleaved Flash within the memory module 16 address space. For example, a configuration indicator of 0x0000 can indicate that the interleaved memory starts at physical address 0x0000 of memory module 16, e.g., the interleaved memory configuration. A configuration indicator of 0x0010 can indicate that the interleaved memory starts at physical address 0x0010 of memory module 16, e.g., a mixed configuration. A configuration indicator of 0xFFFF can indicate that the entire configurable portion of memory module 16 is configured as non-interleaved memory, e.g., a non-interleaved configuration.

At block 303, it is determined whether the memory module 16 address identifying a memory location being accessed (ADDR(MM)) is greater than twice the size of the non-interleaved portion of a flash block as defined by the configuration indicator. If so, it is determined that the memory module 16 address is accessing a configurable memory location memory module 16 as interleaved memory and flow proceeds to 304, otherwise, if the memory module 16 address is less than or equal to twice the size of the non-interleaved portion of a flash block, it is determined that the memory module 16 address is accessing a configurable memory location of memory module 16 as non-interleaved memory and flow proceeds to 307.

At block 304, it is determined whether the memory module 16 address is odd or even. If odd, flow proceeds to block 305. If even, flow proceeds to block 306.

At block 305, the memory module 16 address ADDR(MM) is translated to a flash block address, ADDR(FB), that is provided to FLASH BLOCK0, e.g., the even flash block, to access a memory word. The memory module 16 address ADDR(MM) is translated to the flash block address ADDR(FB) by using the upper N bits of the memory module address, ADDR[N:1](MM), where the memory module 16 address is represented by N+1 bits. At block 306, the memory module 16 address ADDR(MM) is translated to a flash block address, ADDR(FB), that is provided to FLASH BLOCK1, e.g., the odd flash block, to access a memory word. The memory module 16 address ADDR(MM) is translated to the flash block address ADDR(FB) by using the upper N bits of the memory module address, ADDR[N:1](MM), where the memory module address is represented by N+1 bits.

At block 307, in response to determining at block 303 that the memory location being accessed is configured as non-interleaved memory, it is determined whether the memory module 16 address ADDR(MM) is greater than the size of the non-interleaved portion of a flash block. If so, it is determined that the memory module 16 address is accessing a non-interleaved location of the even flash block and flow proceeds to block 308, otherwise, otherwise, if the memory module 16 is less than or equal to the size of the non-interleaved portion of a flash block it is determined that the memory module 16 address is accessing a non-interleaved location of the odd flash memory block module 16 and flow proceeds to 309.

At block 308, the memory module 16 address, ADDR (MM), is translated to a flash block address, ADDR(FB), that is provided to the even flash block, e.g., FLASH BLOCK0, to access a memory word. The memory module 16 address is translated by subtracting the size of the flash block's non-interleaved partition, SIZE(FB, NON-INTERLEAVED), from the memory module address. At block 309, the memory module 16 address ADDR(MM) is translated to a flash block address, ADDR(FB), that is provided to the odd flash block, e.g., FLASH BLOCK1, to access a memory word. The translation at block 309 results in the flash block address being the same as the memory module address.

At block 311, in response to determining the current SOC address is associated with a non-configurable memory location of the memory module 16, the address translator 261 translates the SOC address in a fixed manner to access one of the FLASH BLOCK0 and FLASH BLOCK1. Unlike translations to configurable memory locations of memory module 16, a specific memory module 16 address associated with a non-configurable memory location will translate to a specific physical address of a flash block independent of the configuration indicator. The non-configurable portion of memory module 16 can include non-interleaved memory that stores information used by memory module 16. For example, the non-interleaved portion of memory module 16 can include the programmable storage location 25, which stores the configuration indicator. Flow proceeds to block 312 to wait for a next SOC address that maps to memory module 16 address space prior to flow returning to block 301.

Access requests that are provided by flash interface module 261 to FLASH BLOCK0 and FLASH BLOCK1 are decoded to access their respective memory locations. During operation, referring to FIG. 5, control module 202 will monitor information at CTL_FB, from memory controller 261, to determine when an access request is received. In response to an access request being received, control module 202 will communicate with other portions of flash block 20 to access a memory location of flash array 203. Examples of access requests that can be received at control module 2612 include: a read request; a program request to program information at DATA_FB to a word location at flash array 203 based upon information at DATA_FB; and an erase sector request to erase a specific sector at flash array 203. In a particular embodiment, control module 202 of a flash block does not receive or decode access requests to erase access more than one sector. Instead, the control module 26 of memory module 16 will provide multiple erase sector requests in response to receiving such a request.

The address decode module 201 is connected to ADDR_FB to decode the received flash block address, which is was translated by address translator 2611, and communicates with the other modules of flash block 20 to access word locations of flash array 203 to access a specific memory location of flash array 203. The address decoder module 201 can include an x-decoder, y-decoder, and corresponding multiplexers.

The charge pump 205 communicates with other modules of flash block 20 to program and erase word locations of flash array 203.

Sense amplifier communicates with other modules of flash block 20 to provide information stored at a word location to DATA_FB.

Figure 10:
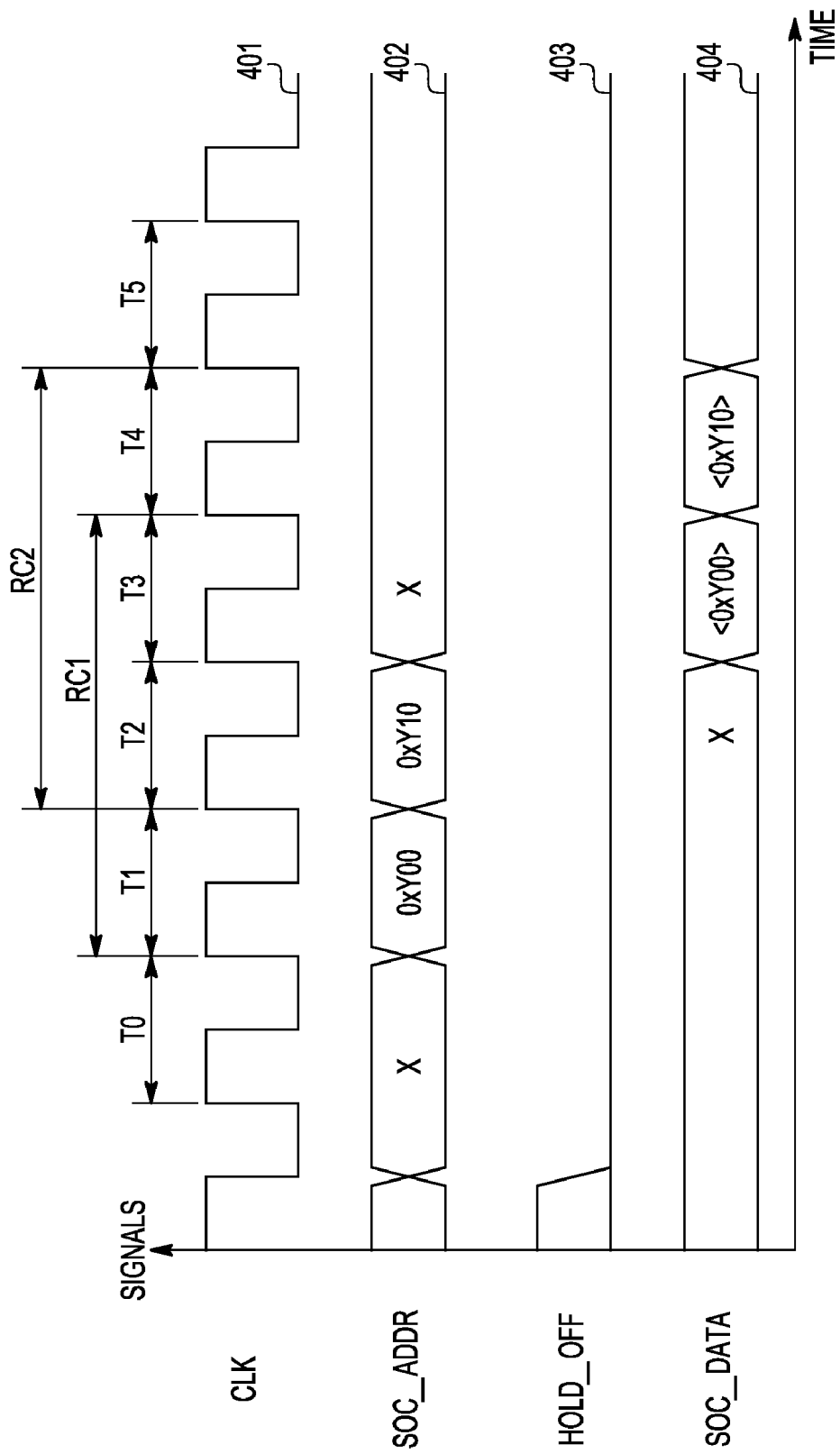
FIGS. 10 and 11 illustrate timing diagrams of access requests in accordance with specific embodiments.

Operation of memory module 16 will be better understood with reference to the timing diagram of FIG. 10, which illustrates the timing for two contiguous read requests to different blocks of memory at memory module 16, where memory module 16 is presumed to be configured as illustrated at FIG. 2. A read request is contiguous to an immediately prior read request when there is no idle time between when the second read request is initiated relative the first read request. In the present example, the second read request is initiated one clock cycle after the first read request. Note the timing diagram of FIG. 10 does not illustrate each control signal associated with a read request, but instead illustrates the relationship between a clock signals (see signal 401 labeled CLK), address information at the address at bus 18 (see signal 402 labeled SOC_ADDR), information returned to bus 18 in response to the address information (see signal 404 labeled SOC_DATA), and information provided to bus 18 by memory module 16 that indicates the read operation is being stalled (see signal 403 labeled HOLD_OFF).

At time T1 a read cycle, labeled RC1, is initiated by an address and appropriate control signal being driven onto bus 18. For example, a SOC address of 0×Y00 is provided to the bus 18 from a requesting device, such as data processor 13, prior to the rising edge of T1, where Y represents the base address of memory module 16 within the SOC address space, and the lower portion "00" of the SOC address represents those bits of the SOC address that corresponds to memory module 16 address, e.g., the bits used to identify a specific word location of memory module 16. Referring to FIG. 2, the address 0×Y00 maps to memory block 22 of memory module 16, as indicated by designator (0) adjacent to address 0×Y00. At time T2, a second read cycle, labeled RC2, that is contiguous to the read request RC1 is initiated to access SOC address 0×Y10 at memory block 23 of memory module 16 as indicated at FIG. 2 by designator (1) adjacent to address 0×Y10. The read request associated with read cycle RC2 is considered contiguous with the read associated with read cycle request RC1 because there are no unused time periods between the start of read cycle RC1 and the start of read cycle RC2. In other words, the second read request could not have been provided to bus 18 any sooner. Because the address associated with read cycle RC2 is to a different memory block of memory module 16 than the address associated with read cycle RC1, the requested information is returned to bus 18 for each of the read requests a fixed amount of time, e.g., two clock cycles, after the start of each respective read requests read, e.g., without intervening unused clock cycles. In other words, the access time illustrated at FIG. 10 represents the best case access time. Therefore, the data associated with address 0×Y00 is returned at time T3, and the data associated with address 0×Y10 is returned at time T4.

Figure 11:
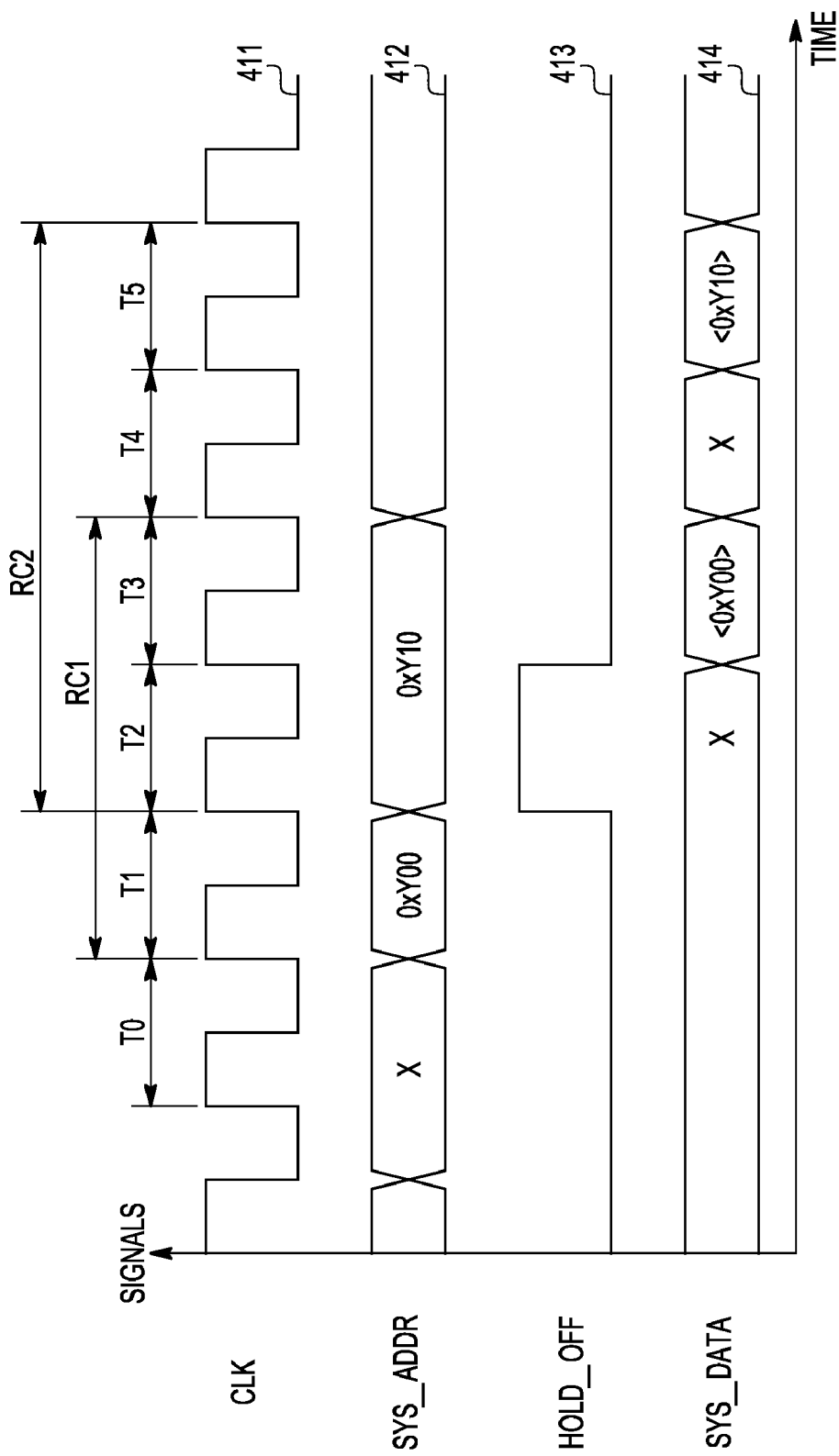

FIG. 11, illustrates two contiguous read requests that are identical to the read requests of FIG. 10 except that the configuration indicator is different, whereby memory module 16 is configured as indicated at FIG. 3, and memory module 16 is partitioned as both non-interleaved memory and interleaved memory. During the first read cycle RC1 of FIG. 11, the SOC address 0×Y00 is translated to the same location of the memory module 16, as indicated by comparing the indicators associated with address 0×Y00 of FIG. 2 and FIG. 3, which is 0$h$ (0) for both memory configurations. However, during the second read cycle, RC2, of FIG. 11, the SOC address 0×Y10 is translated to a different location of the memory module 16. Specifically, for the configuration illustrated at FIG. 3, the memory location indicator associated with address 0×Y10 is 8$h$ (0), which indicates address 0×8 of memory block 22 is being accessed, as opposed to address 0×0 of memory block 23 is accessed as indicated at FIG. 2. Because contiguous read cycles RC1 and RC2 of FIG. 3 access word locations at the same memory block, e.g. memory block 22, signal HOLD_OFF is asserted by memory module 16 during time T2 to indicate to the requesting device that the access request will require additional time, e.g., the access request is stalled, until the rising edge of the next clock period after the HOLD_OFF signal is negated. As illustrated at FIG. 1, the HOLD_OFF signal results in a hold off duration of one clock cycle, thereby resulting the data for read cycle RC2 being provided three clock cycles after the beginning of read cycle RC2, and read cycle RC2 being one clock period longer than read cycle RC1. It will be appreciated that in the specific embodiment illustrated that multiple read requests cannot be received at memory module 16 at the same time, and therefore cannot be simultaneous. In addition, contiguous read requests to the same memory block result in a hold-off period, while contiguous read requests to different blocks of memory do not result in a hold-off period. Therefore, it will be appreciated that read requests are not orthogonal to each other.

It will be appreciated that contiguous read requests to locations of memory module 16 partitioned as non-interleaved memory will result in the timing illustrated at FIG. 11 when the contiguous read requests are to consecutive addresses, because the consecutive addresses translate to access requests to the same memory block module for non-interleaved memory accesses. Conversely, contiguous read requests to locations of memory module 16 partitioned as interleaved memory will result in the timing illustrated at FIG. 10 when the contiguous read requests are to consecutive addresses, because the consecutive addresses translate to access requests to different blocks of memory module 16 for non-interleaved memory accesses.

Figure 12:
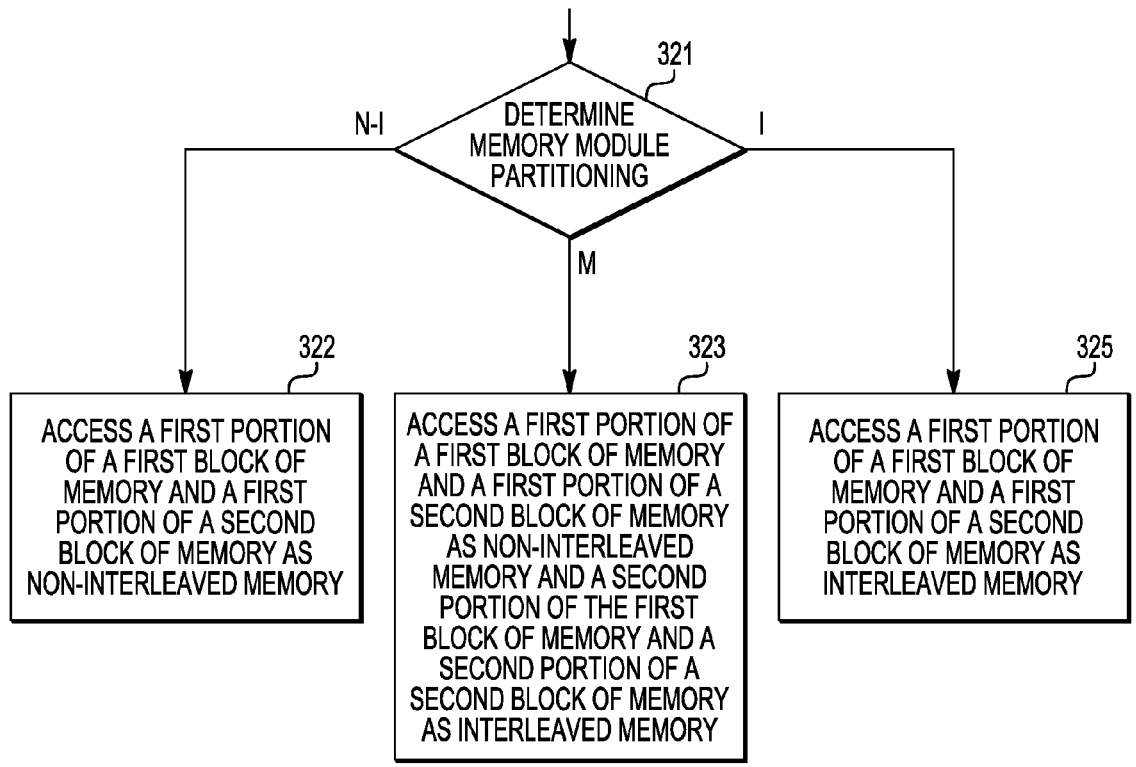
FIGS. 12-16 illustrate flow diagrams for various methods in accordance with specific embodiments.

FIG. 12 illustrates a method in accordance with a specific embodiment of the present disclosure. At block 321, the partitioning of a memory module that includes a first memory block and a second memory block is determined based upon a configuration indicator. The configuration indicator can be a value stored at a programmable storage location. The configuration indicator can indicate whether the memory module is configured in a non-interleaved memory mode of operation that partitions configurable memory of the first and second memory blocks of memory as only non-interleaved, an interleaved memory mode of operation that partitions configurable memory of the first and second memory blocks of memory as only interleaved memory, or mixed memory mode of operation that partitions the configurable memory of the first and second memory blocks of memory as both non-interleaved and interleaved memory. In response to the configuration indicator indicating the memory module is configured in non-interleaved memory mode flow proceeds to block 322 In response to the configuration indicator indicating the memory module is configured in interleaved memory mode flow proceeds to block 325. In response to the configuration indicator indicating the memory module is configured in mixed memory mode flow proceeds to block 323.

At block 322 the physical address space of the first memory block that is configurable and the physical address space of the second memory block that is configurable are mapped by the address module to the address space of the memory module as non-interleaved memory. Therefore, in response to the configuration indicator indicating a non-interleaved memory mode, the memory module will access the first memory block that is configurable and the second memory block that is configurable as non-interleaved memory in response to a received access request. For example, when the first memory block is integrated as part of an integrated circuit, e.g., as part of a system on a chip (SOC) that includes the memory module and a peripheral device, such as a data processing device, all physical addresses of the first memory block that are configurable are mapped by the memory module to a contiguous address range of the memory module, which is itself mapped to a contiguous address range of a larger physical address space, e.g., the address space of the SOC (the SOC address space). Similarly, all physical addresses of the second memory block that are configurable are mapped by the memory module to a different contiguous address range of the memory module, which is itself mapped to a different contiguous SOC address range. Typically, the respective address ranges of the first and second memory blocks of memory that are configurable will be contiguous to each other within the memory module's address space, and therefore contiguous within the SOC address space.

At block 325, the physical address space of the first memory block that is configurable and the physical address space of the second memory block that is configurable are mapped to an address range within the address space of the memory module as interleaved memory based upon the configuration indicator. For example, all physical addresses of the first memory block that are configurable and all physical addresses of the second memory block that are configurable are mapped by the memory module to a contiguous address range of the memory module, which is itself mapped to the SOC address range. Therefore, within the memory module's configurable address space, each address that is associated with an address location of the first memory block is contiguous to two addresses of the memory module address space that are associated with address locations of the second memory block. Note it will be appreciated that the first and last addresses of the interleaved memory may each be contiguous to only one other memory location of the other memory block.

At block 323, a first portion of the physical address space of the first memory block that is configurable and a first portion of the physical address space of the second memory block that is configurable are mapped as non-interleaved memory by the memory module to first and second address ranges, respectively, within the address space of the memory module, and a second portion of the physical address space of the first memory block that is configurable and a second portion of the physical address space of the second memory block that is configurable are mapped as interleaved memory by the memory module to a third address range within the address space of the memory module. A size and location of the first portions and the second portions can be determined based upon the configuration indicator, where the configuration indicator can be programmed, e.g., stored, by a user and can include one or more fields indicating the mode of operation and the size and location of the first and second portions.

Therefore, within the memory module and SOC address spaces, each address that is mapped to the first portion of the physical address space of the first memory block is contiguous, as is each memory module and SOC address that is mapped to the first portion of the second memory block of the memory module.

Figure 13:
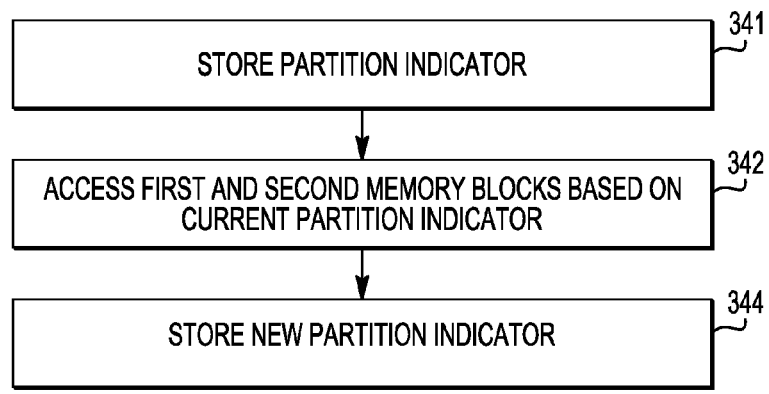

It will be appreciated that the first portion of the first memory block and the first portion of the second memory block are configured as non-interleaved memory in both mixed memory mode and non-interleaved memory mode, and that the second portion of the first memory block and the second portion of the second memory block are configured as interleaved memory in both mixed memory mode and interleaved memory mode. It will be further appreciated that a memory module address, and therefore a SOC address, that is within a configurable range of addresses, can access different memory locations of a memory module depending upon the configuration indicator. In other words, a configurable memory location of a memory module can be accessed by different memory module addresses depending upon the configuration indicator. FIG. 13 illustrates a method in accordance with a specific embodiment of the present disclosure. At block 341 a configuration indicator is stored by a user to indicate the partitioning of first and second memory blocks of a memory module. In one embodiment, a configuration indicator represented by a single field can indicate whether the memory module is configured in a non-interleaved memory mode of operation, an interleaved memory mode of operation, or mixed memory mode of operation. In addition, the size of the interleaved or non-interleaved portion of the blocks of memory can also be indicated by the single field. For example, a configuration indicator of zero (0) can indicate that zero (0) configurable sectors of each of the first and second memory blocks of memory will be mapped as non-interleaved memory. This configuration indicator, therefore, indicates that the memory module is operating in interleaved memory mode, and that starting at a base address location of SOC memory space, the first and second memory blocks are interleaved. A configuration indicator of one (1) can indicate that one (1) configurable sector of each of the first and second memory blocks of memory will be mapped as non-interleaved memory. This configuration indicator indicates that the memory module is operating in mixed memory mode, and that starting at the base address location of the SOC the first two sectors are non-interleaved memory partitions, one sector from each of two blocks, and the remaining sectors are an interleaved memory partition. In another embodiment, a single configuration indicator can indicate the starting address of the interleaved Flash. For example, a configuration indicator of 0x0000 can indicate that the interleaved memory starts at physical address 0x0000 of each memory block of the memory module, thereby indicating that the memory module is operating in interleaved memory mode. A configuration indicator of 0x0010 can indicate that the interleaved memory starts at physical address 0x0010 of each memory block of the memory module, thereby indicating the memory module is operating in mixed memory mode. For example, the configuration indicator of 0x0010 can indicate that memory range 0x0000-0x000F at the first and second memory blocks of the memory module are accessed as non-interleaved memory, and that the remainder of each blocks configurable memory range, such as 0x0010, assuming each memory block has an address range of 0x0000-0xFFFF that is configurable. A configuration indicator of 0xFFFF can indicate that the memory module is operating in non-interleaved memory mode, whereby there is no interleaved memory implemented at configurable addresses of the memory module. It will be appreciated that in other embodiments, the configuration indicator can include multiple fields, for example, one field to indicate a mode of memory operation, and a second field to indicate the size or location of the partitions when in mixed memory mode of operation.

Figure 14:
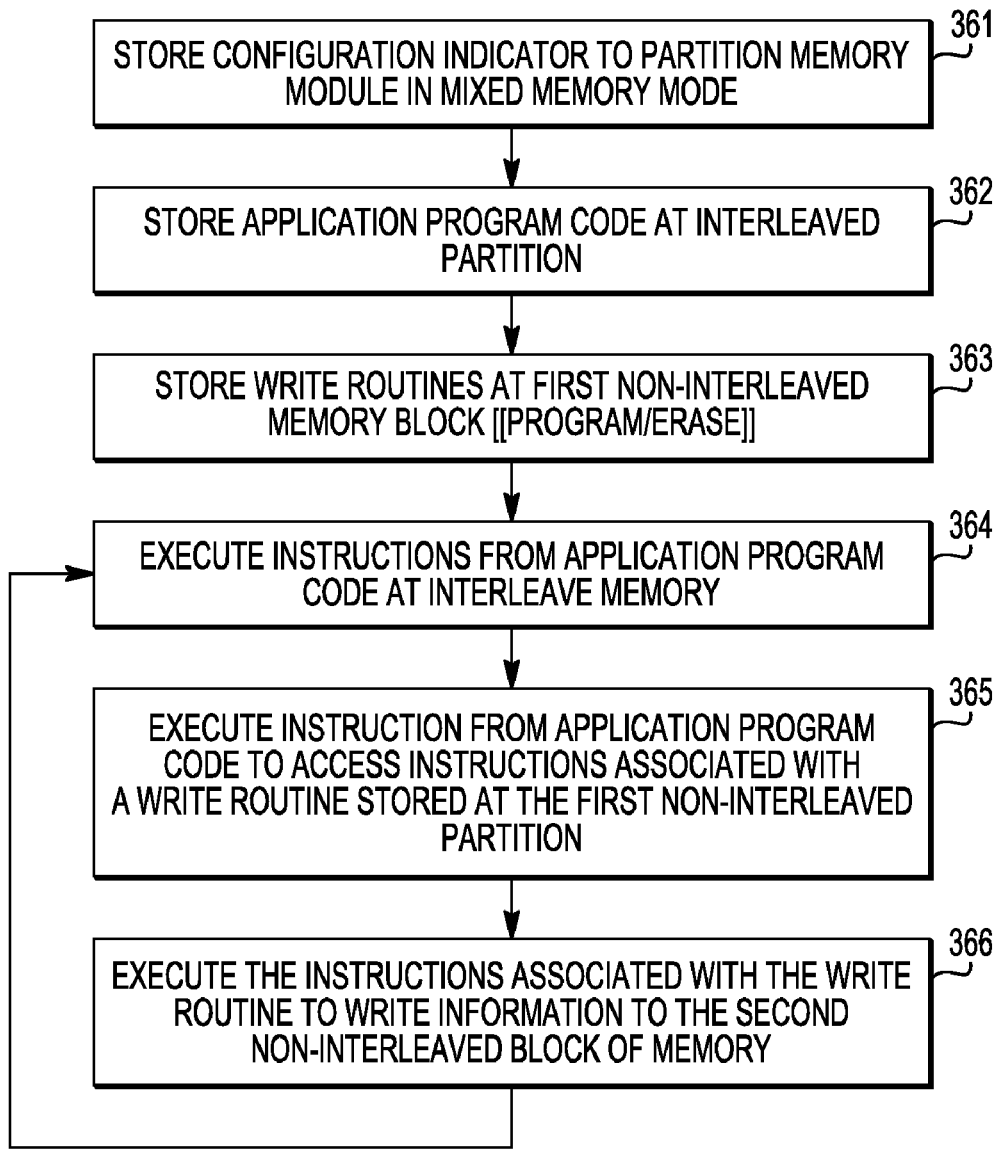

FIG. 14 illustrates a method in accordance with a specific embodiment of the present disclosure. At block 361 a configuration indicator is stored by a user to indicate that the memory module is partitioned in mixed memory mode including an interleaved partition and two non-interleaved partitions as described with respect to FIG. 12.

At block 362 application program instructions are stored at the interleaved partition of the memory module. The application program instructions are user instructions that are fetched and executed by an instruction pipeline (not shown) of a processor core of a general-purpose processor. For example, the instructions can be provided by a user of an SOC that includes the memory module and the general-purpose processor to implement functionality associated with a specific application.

At block 363 user instructions that implement a write routine are stored at a first non-interleaved partition of the first memory block of the memory module. The write routines can be called by the application program code stored at the interleaved module.

At block 364 a fetch module of the pipeline of the processor core provides read requests to the memory module that results in application program instructions stored at the interleaved partition of the memory module being received from the interleaved partition of the memory module and being executed by the pipeline.

At block 365 the fetch module of the pipeline of the processor core provides a read request to the memory module that results in an application program instruction stored at the interleaved partition of the memory module being received and executed by the pipeline, whereby the execution of the application program instruction results in a change of instruction flow causing the fetch module of the pipeline to provide read requests to the memory module that results in instructions associated with a write routine stored at the first non-interleaved partition of the first memory block to be received.

At block 366, the instructions associated with the received write routine are executed at the pipeline to write information to the second non-interleaved portion of the second memory block of the memory module. Once instructions associated with the received write routine are completed, flow returns to block 363 where further user instructions associated with the application program are accessed from the interleaved memory and executed by the pipeline.

Figure 15:
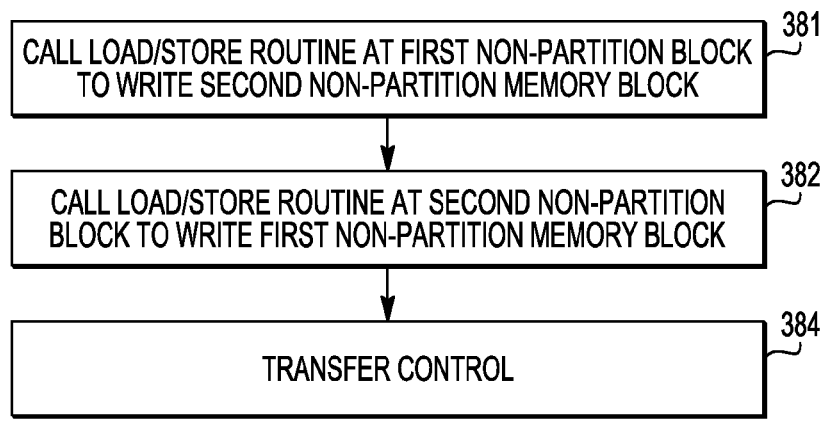

FIG. 15 illustrates a method in accordance with a specific embodiment of the present disclosure whereby user instructions that implement a write routine are stored at a non-interleaved portion of the first memory block of the memory module and at a non-interleaved portion of the second memory block module. The write routines can be part of a boot loader instruction that loads application program instructions into interleaved or non-interleaved portions of the memory module.

At block 381 a write routine at the first memory block is executed at the instruction pipeline of a general purpose processor at the same integrated circuit as the memory module to write information to interleaved and non-interleaved portions of the second memory block.

At block 382 a write routine at the second memory block is executed at the instruction pipeline of the general purpose processor at the same integrated circuit as the memory module to write information to interleaved and non-interleaved portions of the second memory block.

At block 383, control is transferred from the write routine at the second memory block. For example, when the write routines at the first and second memory blocks are part of a boot loader, control is transferred from the boot loader after the write routine at the first memory block causes application program instructions to be written to addresses associated with the second memory block configured as interleaved or non-interleaved memory, and causes control to be transferred to the write routine at the second memory block, and after the write routine at the second memory block causes application program instructions to be written to addresses associated with the first memory block configured as interleaved or non-interleaved memory, and transfers control when complete. For example, control can be transferred to execute the application program instruction loaded by the write routines at blocks 381 and 382.

Figure 16:
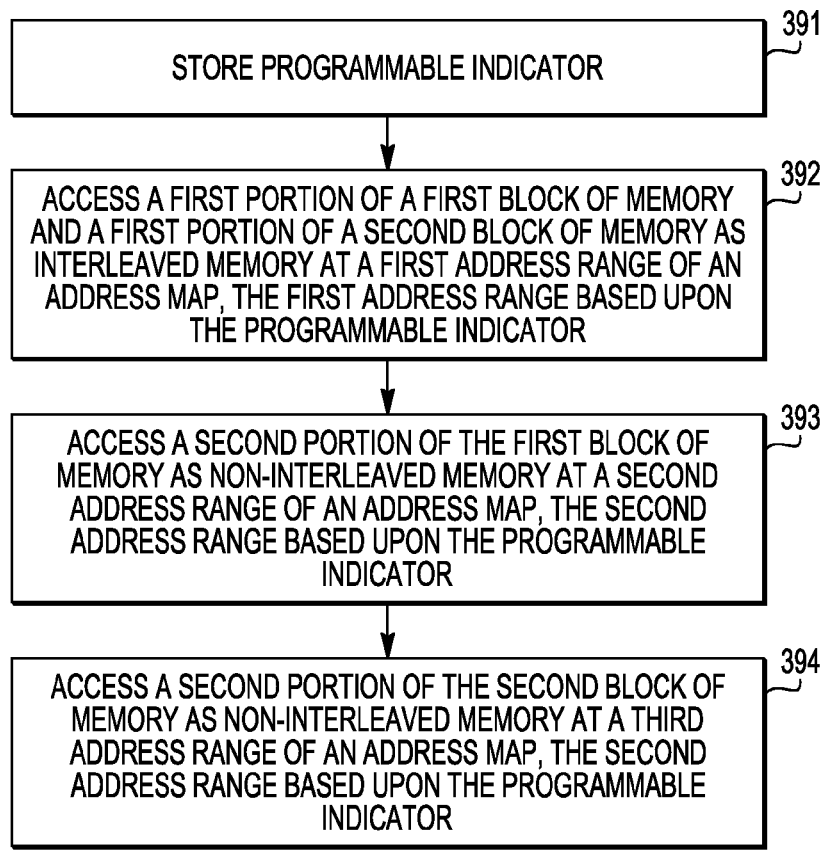

FIG. 16 illustrates a method in accordance with a specific embodiment of the present disclosure. At block 391 a configuration indicator is stored by a user to indicate that the memory module is partitioned in mixed memory mode as described with respect to FIG. 12.

At block 392, a first portion of a first memory block of the memory module and a first portion of a second memory block of the memory module are accessed as interleaved memory at a first address range of an address map, such as the address map of a memory module or a the address map of an SOC that includes the memory module, the first address range is based upon the programmable configuration indicator. For example, the size of address range can be based upon a number of sectors indicated by the programmable indicator as previously discussed.

At block 393, a second portion of the first memory block of the memory module is accessed as non-interleaved memory at a second address range of the address map, the second address range also based upon the programmable indicator.

At block 394, a second portion of the second memory block of the memory module is accessed as non-interleaved memory at a third address range of the address map, the third address range also based upon the programmable indicator.

Figure 17:
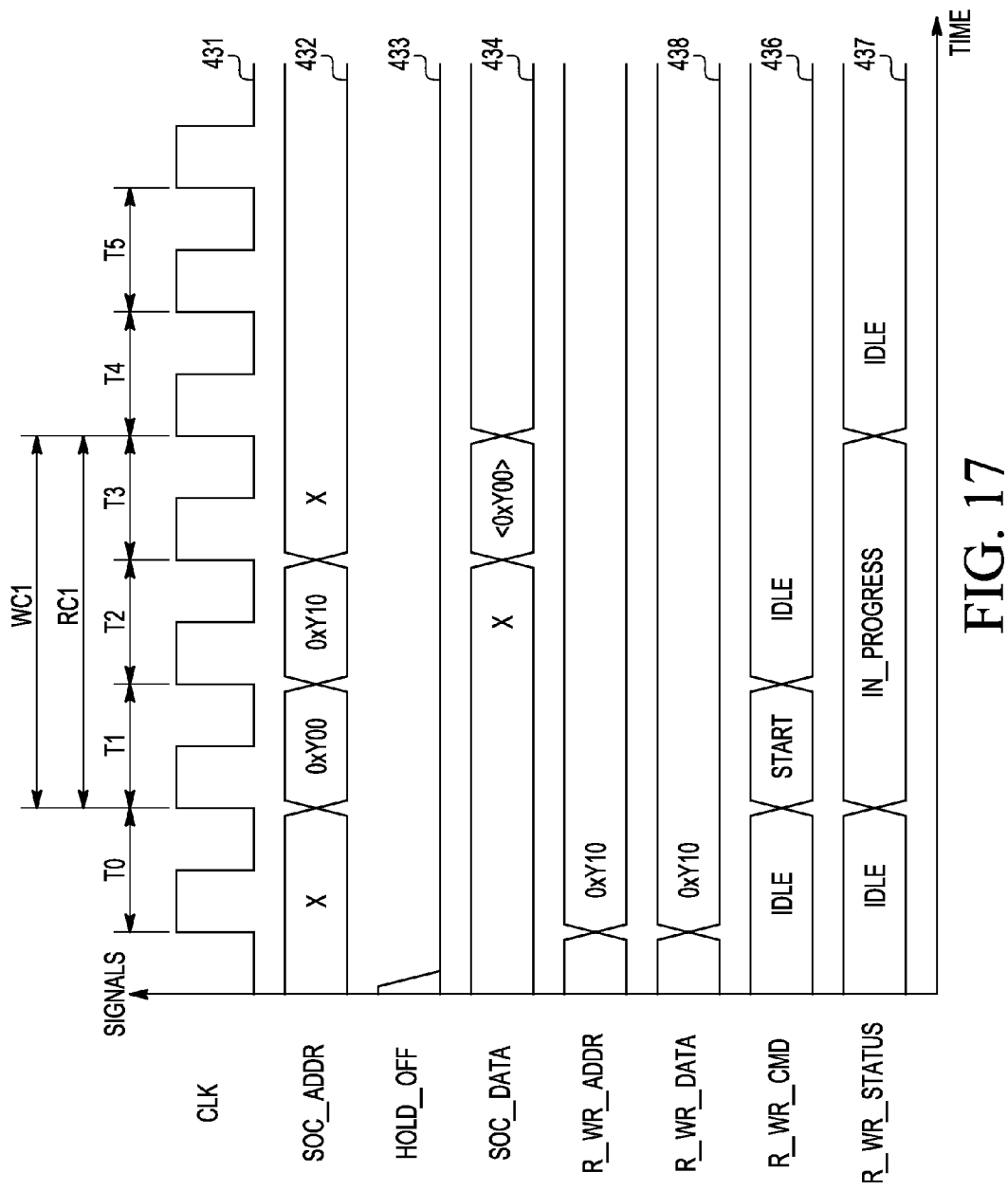
FIG. 17 illustrates a timing diagram for a simultaneous read request and a write request.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive. For example, the specific embodiment described herein at FIG. 9 includes an embodiment whereby each memory block includes an address range that is configurable and an address range that is non-configurable, where the non-configurable address range is a always at a fixed memory module address range that is non-interlaced. It will be appreciated that alternate embodiments can include memory blocks having a non-configurable portion that is always interleaved, and memory blocks of the memory module that have both a non-configurable portion that is always interleaved and a non-configurable portion that is always non-interleaved. While typically a non-configurable portion of a specific interleave type will be mapped to a single contiguous address range of the memory module's address map, it will be appreciated that the non-configurable portion can also be mapped to multiple non-contiguous ranges of the SOC memory map. For example, a non-configurable non-interleaved portion of a first memory block can include multiple partitions that are mapped to multiple non-contiguous address ranges of the memory module's memory map. For example, a memory module can include a first and second sector of non-configurable non-interleaved memory from a first memory block, where the first sector is mapped nearer the top of the memory modules address map than the second sector. The address range between where the first and second sectors are mapped at the memory module can include non-configurable interleaved memory, non-configurable non-interleaved memory from the second memory block, configurable memory, and combinations thereof FIG. 17 illustrates the read-while-write capability of memory module 16. The read request RC1 is similar to the read request RC 1 described previously with reference to FIG. 10, where during the read cycle RC1 of FIG. 17, the SOC address 0xY00 is translated to a location of memory block 22 of the memory module 16, from which data is being read. Prior to the start of write cycle WC1, an address to be accessed during the write cycle is stored at register R_WR_ADDR, data to be written is stored at register R_WR_DATA, and a command indictor, WRITE, is stored at register R_WR_CMD to indicate a write is to occur. According to the memory map of FIG. 2, the SOC address 0xY10 will be translated to a location of memory block 23 of the memory module 16, to which data is being written. Write cycle WC1 begins when a command start indicator is written to the register R_CMD_START at the beginning of time T1. In response, the memory module 16 will update the status of status registers from IDLE to IN PROGRESS to indicate the write request is being processed. The status of the status register R_WR_STATUS is updated to IDLE when the write is complete. In this manner, memory module 16 supports read-while-write accessibility to different non-interleaved data blocks. In other words, a read request to one non-interleaved data memory block module 16 is orthogonal to a write request of a different non-interleaved data memory block module 16.

The term "interleaved" as used herein with respect to a memory block is intended to mean that access requests to consecutive address locations within an address range are retrieved from the memory block and at least one other memory block in an alternating manner. For example, a first memory block is interleaved memory when for a given address range, e.g., from 0x0000-0xFFFF, a memory controller accesses information from the first memory block for access requests having even addresses, and accesses information from a second memory block for access requests having odd addresses.

The term "non-interleaved" as used herein with respect to a memory block is intended to mean that access requests to consecutive address locations within an address range are retrieve from that memory block in a consecutive manner. For example, a first memory block is non-interleaved memory when for a given address range, e.g., from 0x0000-0xFFFF, a memory controller consecutively accesses information from the same block for access requests having either even addresses or odd addresses.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electronic device comprising:
   a memory module comprising a first memory block, a second memory block, a programmable storage location, and a memory controller;
   the first memory block comprising a plurality of data unit locations, and an address decoder coupled to a first access port of the memory controller, the address decoder to select one of the plurality of data unit locations for access in response to receiving address information via the first access port;
   the second memory block comprising a plurality of data unit locations, and an address decoder coupled to a second access port of the memory controller, the address decoder to select one of the plurality of data unit locations for access in response to receiving address information via the second access port;
   the programmable storage location to store configuration information; and
   the memory controller comprising a control port coupled to the programmable storage location, the memory controller to access a first portion of the first memory block and a first portion of the second memory block as interleaved memory or as non-interleaved memory or as a mixture of interleaved memory and non-interleaved memory based upon the programmable configuration information, wherein the configuration information includes a value indicating a size of the first portion of the first memory block to be accessed as interleaved memory.

2. The electronic device of claim 1 further comprising the memory controller to access, in response to the programmable configuration information including a first value, an entire configurable portion of the first memory block as non-interleaved memory, and an entire configurable portion of the second memory block as non-interleaved memory;
   the memory controller to access, in response to the programmable configuration information including a second value, the entire configurable portion of the first memory block and the entire configurable portion of the second memory block as interleaved memory; and
   the memory controller to access, in response to the programmable configuration information including a third value, a first part of the configurable portion of the first memory block and a first part of the configurable portion of the second memory block as interleaved memory and a second part of the configurable portion of the first memory block and a second part of the configurable portion of the second memory block as non-interleaved memory.

3. The device of claim 1 further comprising:
   a first bus; and the memory module further comprising a first port coupled to the first bus; and
   a multiplexer comprising a first input coupled to a data output of the first memory block to receive information stored at one of the plurality of data unit locations of the first memory block, a second input coupled to a data output of the second memory block of memory to receive information stored at one of the plurality of data unit locations of the second memory block, an output coupled to the first port of the memory module to provide information to the first bus, and a select input coupled to the memory controller to communicate information at one of the first input or the second input to the output.

4. The device of claim 3, wherein the first port of the memory module is further coupled to provide a read request to the memory controller to read information stored at either the first memory block or the second memory block, the first memory block and the second memory block operable to be only readable via the first port of the memory module.

5. The device of claim 3, wherein the first port of the memory module is further coupled to a provide a read request to the memory controller to read information stored at either the first memory block or the second memory block; and the device further comprises
   a second bus coupled to a second port of the memory module, the second port of the memory module coupled to provide a write request to the memory controller to write information to be stored at either the first memory block or at the second memory block, the first and the second memory block are operable to be only writeable via the second bus.

6. A method comprising:
   reading a value from a programmable location, the value indicating a size of a partition of memory into interleaved memory and non-interleaved memory;
   partitioning a first portion of a first memory block at an integrated circuit and a first portion of a second memory block at the integrated circuit into a mixture of interleaved memory and non-interleaved memory based upon the value at the programmable location; and
   accessing the first portion of the first memory block and the first portion of the second memory block as the mixture of interleaved memory and non-interleaved memory based upon the value at the programmable location.

7. The method of claim 6 wherein using the first portion of the first memory block includes accessing a first portion of a first non-volatile programmable memory array, and using the first portion of the second memory block includes accessing a first portion of a second non-volatile programmable memory array.

8. The method of claim 6 wherein using the first portion of the first memory block includes the first portion of the first memory block being a first sector of a first flash memory block, and using the first portion of the second memory block includes the first portion of the second memory block being a first sector of a second flash memory block, wherein a sector represents the minimum number of data units that can be erased by a single erase request.

9. The method of claim 6, wherein:
   the method comprises determining, based upon the size of the partition of the first portion of the first memory block, a size of an interleaved partition at the first memory block and a size of an interleaved partition at the second memory block, and in response to determining the size of the interleaved partition at the first memory block, using the interleaved partition at the first memory block and the interleaved partition at the second memory block as interleaved memory, wherein the interleaved partition at the first memory block includes the first portion of the first memory block, and the interleaved partition at the second memory block includes the first portion of the second memory block; and the first memory block has a physical address range and the second memory block has the physical address range, and, in response to a first value at the programmable location, the size of the interleaved partition at the first memory block is determined to be the entire physical address range and the interleaved partition at the second memory block is determined to be the entire physical address range.

10. The method of claim 9, wherein the first memory block has a physical address range and the second memory block has the physical address range, and, in response to a second value at the programmable location, the size of the interleaved partition at the first memory block is determined to be the none of the physical address range and the size of the interleaved partition at the second memory block is determined to be none of the physical address range.

11. The method of claim 6 wherein the first memory block and the second memory block are non-volatile programmable memory and further comprising:
    determining, based upon the size of the partition of the first portion of the first memory block, a size of an interleaved partition and a non-interleaved partition at the first memory block and a size of an interleaved partition and a non-interleaved partition at the second memory block, and in response to determining the size of the interleaved partition at the first memory block, using the interleaved partition at the first memory block and the interleaved partition at the second memory block as interleaved memory, and using the non-interleaved partition at the first memory block and the non-interleaved partition at the second memory block as non-interleaved memory; and
    writing information at the second memory block in response to executing, at a data processor disposed at a die common to the first memory block and to the second memory block, a set of user instructions accessed from the non-interleaved partition at the first memory block.

12. The method of claim 6 wherein the first memory block and the second memory block are non-volatile programmable memory and further comprising:
    determining, based upon the size of the partition of the first portion of the first memory block, a size of an interleaved partition and a non-interleaved at the first memory block and a size of an interleaved partition and a non-interleaved partition at the second memory block, and in response to determining the size of the interleaved partition at the first memory block, using the interleaved partition at the first memory block and the interleaved partition at the second memory block as interleaved memory, and using the non-interleaved partition at the first memory block and the non-interleaved partition at the second memory block as non-interleaved memory; and
    executing, at a data processor disposed at a die common to the first memory block and to the second memory block, a first set of user instructions accessed from the interleaved partition at the first memory block and the interleaved partition at the second memory block; and
    writing information to the non-interleaved partition at the second memory block in response to executing, at the data processor, a second set of user instructions accessed from the non-interleaved partition at the first memory block.

13. The method of claim 6 wherein the first memory block and the second memory block are non-volatile programmable memory and further comprising:
    determining, based upon the size of the partition of the first portion of the first memory block, a size of an interleaved partition and a non-interleaved partition at the first memory block and a size of an interleaved partition and a non-interleaved partition at the second memory block, and in response to determining the size of the interleaved partition at the first memory block, using the interleaved partition at the first memory block and the interleaved partition at the second memory block as interleaved memory, and using the non-interleaved partition at the first memory block and the non-interleaved partition at the second memory block as non-interleaved memory;
    writing first user instructions to the interleaved partition at the first memory block in response to executing, at a data processor disposed at a die common to the first memory block and to the second memory block, a first set of user instructions accessed from the non-interleaved partition at the second memory block;
    writing second user instructions to the interleaved partition at the second memory block in response to executing, at the data processor, a second set of user instructions accessed from the non-interleaved partition at the first memory block; and
    executing, at the data processor, the first and second user instructions accessed from the interleaved partition at the first memory block and from the interleaved partition at the second memory block.

14. The method of claim 6, wherein the value at the programmable location indicates a number of sectors of the first portion of the first memory block.

15. The method of claim 6, wherein:
    the value at the programmable location indicates an address of the first portion of the first memory block; and
    the address lies on a boundary between the interleaved memory and non-interleaved memory.

16. The method of claim 6, further comprising:
    receiving an address representing a location of the first portion of the first memory block or the first portion of a second memory block; and
    mapping the address to the location, the mapping based upon the size of the partition of the first portion.

17. The method of claim 16, wherein the mapping comprises:
    determining if $A>(2*NIL)-1$, wherein IL is a size of interleaved memory of the first portion of the first memory block, NIL is a size of non-interleaved memory of the first portion of the first memory block, and A is the address;
    if so;
        if A is even, mapping A to a location of the first portion of the first memory block, based upon least significant digits of A; and
        if A is odd, mapping A to a location of the first portion of the second memory block, based upon least significant digits of A; and if not;
  if A≦(2*NIL)−1;
    if A<NIL, mapping A to a location of the first portion of the first memory block, based upon least significant digits of A; and
    if A≧NIL, mapping the value (A−NIL) to a location of the first portion of the second memory block, based upon least significant digits of the value (A−NIL).

18. An electronic device comprising:
a memory module comprising a first memory block, a second memory block, a programmable storage location, a bus port, a multiplexer, and a memory controller;
the first memory block comprising a plurality of data unit locations, and an address decoder coupled to a first access port of the memory controller, the address decoder to select one of the plurality of data unit locations for access in response to receiving address information via the first access port;
the second memory block comprising a plurality of data unit locations, and an address decoder coupled to a second access port of the memory controller, the address decoder to select one of the plurality of data unit locations for access in response to receiving address information via the second access port;
the programmable storage location to store configuration information;
a first bus coupled to the bus port;
the bus port further coupled to provide a read request to the memory controller to read information stored at either the first memory block or the second memory block, the first memory block and the second memory block operable to be only readable via the first port of the memory module;
a multiplexer comprising a first input coupled to a data output of the first memory block to receive information stored at one of the plurality of data unit locations of the first memory block, a second input coupled to a data output of the second memory block of memory to receive information stored at one of the plurality of data unit locations of the second memory block, an output coupled to the bus port of the memory module to provide information to the first bus, and a select input coupled to the memory controller to communicate information at one of the first input or the second input to the output, wherein the first port of the memory module is further coupled to provide a read request to the memory controller to read information stored at either the first memory block or the second memory block, the first memory block and the second memory block operable to be only readable via the first port of the memory module; and
the memory controller comprising:
a control port coupled to the programmable storage location, the memory controller to access a first portion of the first memory block and a first portion of the second memory block as interleaved memory or as non-interleaved memory based upon the programmable configuration information, wherein the configuration information includes a value indicating a size of the first portion of the first memory block to be accessed as interleaved memory.

19. The electronic device of claim 18, further comprising a second bus coupled to a second port of the memory module, the second port of the memory module coupled to provide a write request to the memory controller to write information to be stored at either the first memory block or at the second memory block, the first and the second memory block are operable to be only writeable via the second bus.

20. The device of claim 19, wherein the first memory block and second memory block are operable so that the read timing of the first memory block is not affected by a simultaneous write to the second memory block.

* * * * *